United States Patent
Gnatyuk et al.

(10) Patent No.: US 11,265,459 B2
(45) Date of Patent: Mar. 1, 2022

(54) ELECTRONIC DEVICE AND CONTROL METHOD THEREFOR

(71) Applicant: Samsung Electronics Co., Ltd., Suwon-si (KR)

(72) Inventors: Vitaly Sergeevich Gnatyuk, Moscow (RU); Sergey Stanislavovich Zavalishin, Moscow (RU); Xenya Yurievna Petrova, Saint-Petersburg (RU); Gleb Andreevich Odinokikh, Moscow (RU); Alexey Bronislavovich Danilevich, Moscow (RU); Alexey Mikhailovich Fartukov, Moscow (RU); Vladimir Alexeevich Eremeev, Moscow (RU); Dae-kyu Shin, Suwon-si (KR); Ju-woan Yoo, Suwon-si (KR); Kwang-hyun Lee, Suwon-si (KR); Hee-jun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/640,001

(22) PCT Filed: Aug. 31, 2018

(86) PCT No.: PCT/KR2018/010152
§ 371 (c)(1),
(2) Date: Feb. 18, 2020

(87) PCT Pub. No.: WO2019/045521
PCT Pub. Date: Mar. 7, 2019

(65) Prior Publication Data
US 2020/0186702 A1 Jun. 11, 2020

(30) Foreign Application Priority Data
Sep. 1, 2017 (RU) .................... 2017130895

(51) Int. Cl.
*H04N 5/232* (2006.01)
*G06K 9/46* (2006.01)
*H04N 5/235* (2006.01)

(52) U.S. Cl.
CPC .......... *H04N 5/23219* (2013.01); *G06K 9/46* (2013.01); *H04N 5/2351* (2013.01); *H04N 5/2354* (2013.01); *H04N 5/23293* (2013.01)

(58) Field of Classification Search
CPC .......... H04N 5/23219; H04N 5/23293; H04N 5/2351; H04N 5/2354; G06K 9/46;
(Continued)

(56) References Cited

U.S. PATENT DOCUMENTS

| 5,093,716 A | 3/1992 | Kondo et al. |
| 5,128,769 A | 7/1992 | Arai et al. |

(Continued)

FOREIGN PATENT DOCUMENTS

| EP | 1 444 667 A | 8/2004 |
| EP | 1 667 080 A1 | 6/2006 |

(Continued)

OTHER PUBLICATIONS

International Search Report dated Dec. 3, 2018, issued in International Patent Application No. PCT/KR2018/010152.
(Continued)

*Primary Examiner* — Jason A Flohre
(74) *Attorney, Agent, or Firm* — Jefferson IP Law, LLP

(57) ABSTRACT

According to an aspect of an embodiment of the disclosure, an electronic device includes: a photographing device; a memory storing one or more instructions; and at least one processor configured to execute the one or more instructions stored in the memory to capture a first image by using the photographing device, perform first adjustment on an exposure value based on the first image, when the first image does
(Continued)

not satisfy a first condition, perform second adjustment on the exposure value based on a second image acquired by applying a mask having a high weight for a region of interest to the first image, when the second image does not satisfy a second condition, adjust at least one photographing setting value based on the adjusted exposure value, and capture, by using the photographing device, a third image based on the adjusted at least one photographing setting value.

20 Claims, 22 Drawing Sheets

(58) Field of Classification Search
CPC .. G06K 9/36; G06K 9/62; G06T 2207/10144; G06T 2207/30201; G06T 2207/30168; G06T 5/40; G06T 7/0002; G03B 7/00
See application file for complete search history.

(56) References Cited

U.S. PATENT DOCUMENTS

| | | | |
|---|---|---|---|
| 5,455,685 A | 10/1995 | Mori | |
| 5,610,654 A | 3/1997 | Parulski et al. | |
| 5,745,808 A | 4/1998 | Tintera | |
| 5,764,291 A | 6/1998 | Fullam | |
| 5,880,782 A | 3/1999 | Koyanagi et al. | |
| 6,486,915 B2 | 11/2002 | Bell et al. | |
| 6,765,619 B1 | 7/2004 | Deng et al. | |
| 6,940,545 B1 | 9/2005 | Ray et al. | |
| 7,030,911 B1 | 4/2006 | Kubo | |
| 7,099,056 B1 | 8/2006 | Kindt | |
| 7,298,412 B2 | 11/2007 | Sannoh et al. | |
| 7,546,026 B2 | 6/2009 | Pertsel et al. | |
| 7,916,971 B2 | 3/2011 | Bigioi et al. | |
| 8,023,034 B2 | 9/2011 | Numata | |
| 8,408,464 B2 | 4/2013 | Zhu et al. | |
| 8,786,730 B2 | 7/2014 | Tardif et al. | |
| 8,885,068 B2 | 11/2014 | Kim et al. | |
| 9,288,400 B2 | 3/2016 | Youn et al. | |
| 9,402,035 B2 | 7/2016 | Benderius | |
| 9,436,870 B1 | 9/2016 | Mangiat et al. | |
| 9,456,146 B2 | 9/2016 | Yamada | |
| 9,536,292 B2 | 1/2017 | Afrooze et al. | |
| 9,544,502 B2 | 1/2017 | Asakura et al. | |
| 9,544,503 B2 | 1/2017 | Shroff | |
| 2003/0071908 A1 | 4/2003 | Sannoh et al. | |
| 2006/0039690 A1 | 2/2006 | Steinberg et al. | |
| 2006/0210256 A1 | 9/2006 | Fukui et al. | |
| 2009/0080715 A1 | 3/2009 | van Beek et al. | |
| 2009/0175511 A1 | 7/2009 | Lee et al. | |
| 2009/0297038 A1* | 12/2009 | Ishikawa | G06K 9/3275 382/209 |
| 2012/0062720 A1 | 3/2012 | Choi et al. | |
| 2012/0307107 A1* | 12/2012 | Brunner | H04N 5/2351 348/229.1 |
| 2014/0198218 A1 | 7/2014 | Afrooze et al. | |
| 2014/0348399 A1* | 11/2014 | Kuo | G06K 9/00288 382/118 |
| 2015/0312460 A1* | 10/2015 | Benderius | G03B 7/00 348/364 |
| 2016/0188860 A1 | 6/2016 | Lee et al. | |
| 2017/0061210 A1* | 3/2017 | Ollila | H04N 1/00307 |
| 2017/0111569 A1 | 4/2017 | Kim | |
| 2017/0147878 A1 | 5/2017 | Tang | |
| 2017/0150025 A1 | 5/2017 | Tang | |
| 2020/0118257 A1* | 4/2020 | Zeng | H04N 5/2355 |

FOREIGN PATENT DOCUMENTS

| | | |
|---|---|---|
| EP | 2 806 373 A2 | 11/2014 |
| JP | 2007-094535 A | 4/2007 |
| JP | 2008-005081 A | 1/2008 |
| JP | 2008-139973 A | 6/2008 |
| JP | 2009-182461 A | 8/2009 |
| JP | 5761789 B2 | 8/2015 |
| KR | 10-2012-0038755 A | 4/2012 |
| RU | 2 628 201 C1 | 8/2017 |
| RU | 2 628 916 C2 | 8/2017 |
| RU | 2 630 742 C1 | 9/2017 |
| WO | 2010/071329 A2 | 6/2010 |

OTHER PUBLICATIONS

Russian Search Report dated Mar. 22, 2018, issued in Russian Patent Application No. 2017130895.
Russian Decision to Grant dated Jul. 16, 2018, issued in Russian Patent Application No. 2017130895.
European Search Report dated Jun. 23, 2020, issued in European Application No. 18851673.6.
European Office Action dated Nov. 4, 2021, issued in European Patent Application No. 18 851 673.6.

* cited by examiner

FIG. 20

| NUMBER OF FALSE REJECTIONS FOR AUTHENTICATION PROCEDURE | | |
|---|---|---|
| USER ID | COMPARATIVE EXAMPLE | EMBODIMENT OF DISCLOSURE |
| 1 | 30 | 3 |
| 2 | 28 | 0 |
| 3 | 22 | 0 |
| 4 | 30 | 0 |
| 5 | 25 | 0 |
| 6 | 18 | 1 |
| 7 | 27 | 0 |
| 8 | 19 | 0 |
| 9 | 11 | 0 |
| 10 | 27 | 1 |
| FRR | 82.3% | 1.6% |

ELECTRONIC DEVICE AND CONTROL METHOD THEREFOR

TECHNICAL FIELD

Embodiments of the disclosure relate to an electronic device, a control method of the electronic device, and a computer program product including instructions for executing the control method of the electronic device.

BACKGROUND ART

A typical method for auto exposure control performs user biometrics by adjusting image exposure as a whole, that is, without considering illumination of various parts (for example, an eye region) of a body. However, the method has a disadvantage that it adjusts exposure in view of vision rather than the accuracy of biometrics. The method could improve image quality that is recognized by a human, but has a high failure rate of biometrics. Therefore, the method is not suitable for a user's biometrics. For example, the typical method automatically adjusts image exposure to provide accurate exposure to an image as a whole. However, illumination of an eye region on such an image would be insufficient in recognizing a user's body (for example, iris). As a result, the user may not be identified. For example, the user may fail to unlock his/her own device or to obtain approval for a payment transaction through his/her own device.

Another typical method for auto exposure control uses face recognition technology. However, the typical method requires complicated calculations, and therefore, the method is difficult to be applied to electronic devices such as mobile devices having limited resources. For example, U.S. Pat. No. 7,298,412 B2 (2007 Nov. 20) discloses an auto exposure method using sub-optimized Garver wavelets and graph matching.

Another typical method for auto exposure control uses a gradual exposure control method in which camera settings are adjusted in unit of frames to optimal values over a long time. The method has a disadvantage that a considerably long time is taken to obtain sufficiently exposed images, due to a large number of repetitive processings. An example of the approach is disclosed in U.S. Pat. No. 9,536,292 B2 (2017 Jan. 3).

DESCRIPTION OF EMBODIMENTS

Technical Problem

Embodiments of the disclosure relate to performing exposure correction suitable for recognition of a region of interest.

Also, embodiments of the disclosure relate to improving recognition accuracy and a recognition success rate for a region of interest.

Also, embodiments of the disclosure relate to improving accuracy of biometric authentication.

Solution to Problem

According to an aspect of an embodiment of the disclosure, there is provided an electronic device including: a photographing device; a memory storing one or more instructions; and at least one processor configured to execute the one or more instructions stored in the memory to capture a first image by using the photographing device, perform first adjustment on an exposure value based on the first image when the first image does not satisfy a first condition, perform second adjustment on the exposure value, based on a second image acquired by applying a mask having a high weight for a region of interest to the first image, when the second image does not satisfy a second condition, adjust at least one photographing setting value based on the adjusted exposure value, and capture, by using the photographing device, a third image based on the adjusted at least one photographing setting value.

According to an embodiment, the at least one processor may be further configured to execute the one or more instructions to perform user authentication based on the third image.

According to an embodiment, the at least one processor may be further configured to execute the one or more instructions to generate the mask based on a registration image stored in advance from a plurality of captured images.

The at least one processor may be further configured to execute the one or more instructions to generate the mask by determining dissimilarity between each of the plurality of captured images and the registration image, comparing the dissimilarity of the registration image with a pre-set dissimilarity threshold value to determine the region of interest on a mask image based on a result of the comparing, and applying a higher weight to the region of interest than to the remaining region except for the region of interest in the mask image.

According to an embodiment, the at least one processor may be further configured to execute the one or more instructions to determine whether the first image satisfies the first condition, based on a first illumination index determined based on pixel values of the first image, wherein, in the first adjustment, a current exposure value may be maintained when the first image satisfies the first condition, and the first adjustment may be performed on the exposure value when the first image does not satisfy the first condition.

In the first adjustment, when the first image does not satisfy the first condition, it may be determined whether an estimated exposure value for the first image is within a second range, and the first adjustment may be performed on the exposure value when the estimated exposure value is not within the second range.

The at least one processor may be further configured to execute the one or more instructions to determine whether the second image satisfies the second condition, based on a second illumination index determined based on pixel values of the second image, wherein, in the second adjustment, the exposure value may be maintained when the second image satisfies second condition, and the second adjustment may be performed on the exposure value when the second image does not satisfy the second condition.

The at least one photographing setting value may be selected from a group consisting of an aperture value, a shutter speed, sensitivity of an image pickup device, an exposure time, a gain, a pulse width, a current intensity, and a pulse delay.

The photographing device may have an infrared photographing function, and the at least one processor may be further configured to execute the one or more instructions to instruct the photographing device to capture the first image and the third image using the infrared photographing function.

The region of interest may include at least one region selected from a group consisting of an iris region, a face region, a palm region, a vein region, and a vehicle headlamp region.

According to another aspect of an embodiment of the disclosure, there is provided a control method of an electronic device, including: capturing a first image; performing first adjustment on an exposure value based on the first image when the first image does not satisfy the first condition; performing second adjustment on the exposure value based on a second image acquired by applying a mask having a high weight for a region of interest to the first image, when the second image does not satisfy a second condition; adjusting at least one photographing setting value based on the adjusted exposure value; and capturing a third image based on the adjusted at least one photographing setting value.

According to another aspect of an embodiment of the disclosure, there is provided a computer program product including a recording medium storing program commands instructing, when being executed by a processor, the processor to perform a control method of an electronic device, the control method of the electronic device, including: capturing a first image; performing first adjustment on an exposure value based on the first image when the first image does not satisfy the first condition; performing second adjustment on the exposure value based on a second image acquired by applying a mask having a high weight for a region of interest to the first image, when the second image does not satisfy a second condition; adjusting at least one photographing setting value based on the adjusted exposure value; and capturing a third image based on the adjusted at least one photographing setting value.

Advantageous Effects of Disclosure

According to embodiments of the disclosure, it may be possible to perform exposure correction suitable for recognition of a region of interest.

Also, according to embodiments of the disclosure, it may be possible to improve recognition accuracy and a recognition success rate for a region of interest.

Also, according to embodiments of the disclosure, it may be possible to improve accuracy of biometric authentication.

BRIEF DESCRIPTION OF DRAWINGS

In FIG. 12, an embodiment of iris recognition will be described.

FIG. 20 is a view for describing recognition success rates in an electronic device according to embodiments of the disclosure.

BEST MODE

Figure 1:
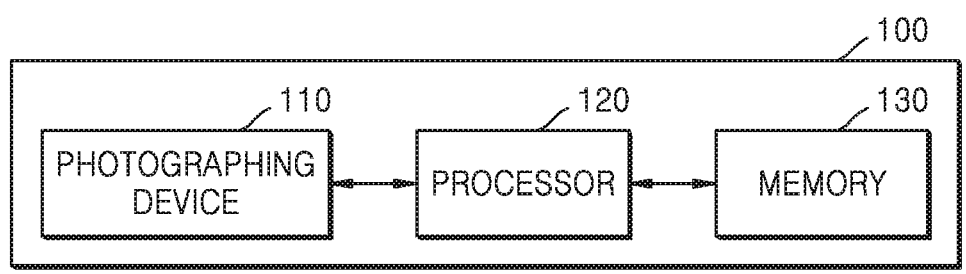
FIG. 1 shows a configuration of an electronic device 100 according to an embodiment.

According to an aspect of an embodiment of the disclosure, there is provided an electronic device including: a photographing device; a memory storing one or more instructions; and at least one processor configured to execute the one or more instructions stored in the memory to capture a first image by using the photographing device, perform first adjustment on an exposure value based on the first image when the first image does not satisfy a first condition, perform second adjustment on the exposure value, based on a second image acquired by applying a mask having a high weight for a region of interest to the first image, when the second image does not satisfy a second condition, adjust at least one photographing setting value based on the adjusted exposure value, and capture a third image based on the adjusted at least one photographing setting value by using the photographing device.

Mode of Disclosure

Although general terms being widely used at the disclosure were selected as terminology used in the disclosure while considering the functions of the embodiments of the disclosure, they may vary according to intentions of one of ordinary skill in the art, judicial precedents, the advent of new technologies, and the like. Also, terms arbitrarily selected by the applicant of the disclosure may also be used in a specific case. In this case, their meanings need to be given in the detailed description of the disclosure. Hence, the terms must be defined based on the meanings of the terms and the contents of the entire specification, not by simply stating the terms themselves.

Also, in the entire specification, it will be understood that when a certain part "includes" a certain component, the part does not exclude another component but can further include another component, unless the context clearly dictates otherwise. The terms "portion", "part", "module", and the like used herein refer to a unit used to process at least one function or operation, and may be implemented by hardware, software, or a combination thereof.

Hereinafter, the embodiments will be described in detail with reference to the accompanying drawings so that those skilled in the art to which the embodiments of the disclosure pertain can easily carry out the embodiments. However, the embodiments of the disclosure may be implemented in different forms, without being limited to the embodiments described herein. In the drawings, parts that are irrelevant to the descriptions may be not shown in order to clearly describe the embodiments. Throughout the specification, similar parts will be assigned similar reference numerals.

In the embodiments of the disclosure, the term "user" indicates a person that uses or controls a system, a function or an operation, and may include a developer, a manager, or an installation engineer.

FIG. 1 shows a configuration of an electronic device 100 according to an embodiment.

The electronic device 100 according to an embodiment may include a photographing device 110, a processor 120, and a memory 130.

The electronic device 100 may be implemented as various types of electronic devices having a photographing function and a processing function. The electronic device 100 may be one of various electronic devices, such as, for example, a mobile phone, a tablet PC, a laptop computer, a desktop computer, a vehicle, a digital camera, a camcorder, an e-book terminal, a terminal for digital broadcasting, personal digital assistant (PDA), a portable multimedia player (PMP), a navigation system, an MP3 player, and a wearable device. Also, the electronic device 100 may interwork with a security system. For example, the electronic device 100 may be implemented as a biometric authentication terminal that interworks with an entrance security system.

The electronic device 100 may be installed in or detachably attached to a predetermined system. For example, the electronic device 100 may be detachably attached to a predetermined system through an input/output device (for example, a universal serial bus (USB) port).

The photographing device 110 may photoelectrically convert incident light to generate an electrical image signal. The photographing device 110 may be integrated into the electronic device 100 or detachably attached to the electronic device 100. The photographing device 110 according to an embodiment may include a lens, a lens driver, an aperture, an aperture driver, an image pickup device, and an image pickup device controller.

The lens may include a plurality of groups of lenses or a plurality of pieces of lenses. A position of the lens may be adjusted by the lens driver. The lens driver may adjust a position of the lens according to a control signal provided from the processor 120. For example, the lens driver may receive a zooming control signal from the processor 120 to adjust a position of the lens, thereby performing a zoom-in operation and a zoom-out operation. According to an embodiment, the lens driver may drive the lens for operations, such as focal length adjustment, hand-shake correction, wide angle adjustment, etc.

A degree of opening of the aperture may be adjusted by the aperture driver, and the aperture may adjust an amount of light that is incident to the image pickup device.

An optical signal transmitted through the lens and the aperture may arrive at a light receiving surface of the image pickup device to form an image of a subject. The image pickup device may be a charge coupled device (CCD) image sensor or a complementary metal oxide semiconductor image sensor (CIS) for converting an optical signal into an electrical signal. Sensitivity, etc. of the image pickup device may be adjusted by the image pickup device controller. The image pickup device controller may control the image pickup device according to a control signal generated automatically by an image signal received in real time or a control signal received manually by a user's control.

An exposure time of the image pickup device may be adjusted by a shutter. There are a mechanical shutter that moves a screen to adjust entrance of light, and an electronic shutter that supplies an electrical signal to an image pickup device to control exposure.

The photographing device 110 may operate according to a photographing setting value determined by the processor 120. The photographing setting value may include an aperture value, a shutter speed, sensitivity of the image pickup device, an exposure time, a gain, a pulse width, a current intensity, a pulse delay, etc. When the processor 120 adjusts a photographing setting value, an exposure level of the photographing device 110 may change.

The processor 120 may execute at least one instruction stored in the memory 130, and control overall operations of the electronic device 100. The processor 120 may control components of the electronic device 100 to perform an operation according to an instruction. The processor 120 may include one or more processors. The processor 120 may be implemented in the form of, for example, a general-purpose processor, a microprocessor, an artificial intelligence processor, a graphic card, etc., and may include a combination of various types of processors.

The processor 120 according to an embodiment may capture a first image through the photographing device 110, perform first adjustment on at least one photographing setting value based on the first image when the first image satisfies a first condition, perform second adjustment on the at least one photographing setting value based on a second image acquired by applying a mask having a high weight for a region of interest to the first image when the second image satisfies a second condition, and capture, through the photographing device 110, a third image based on the at least one photographing setting value on which the second adjustment is performed. Operations of the processor 120 will be described in detail, later.

The memory 130 may store an instruction, data, and a program. The program stored in the memory 130 may include one or more instructions. The program (one or more instructions) or an application stored in the memory 130 may be executed by the processor 120. The instruction, data, or program of the memory 130 may have already been installed in the electronic device 100 when the electronic device 100 was purchased, or the instruction, data, or program of the memory 130 may be downloaded and stored by a user's control or through firmware, etc. installed in the electronic device 100 when the electronic device 100 is used. Accordingly, operations of the embodiments of the disclosure may have already been installed and performed in the electronic device 100 when the electronic device 100 was purchased, or may be performed in the electronic device 100 when data or a program is downloaded after the electronic device 100 is purchased.

Figure 2:
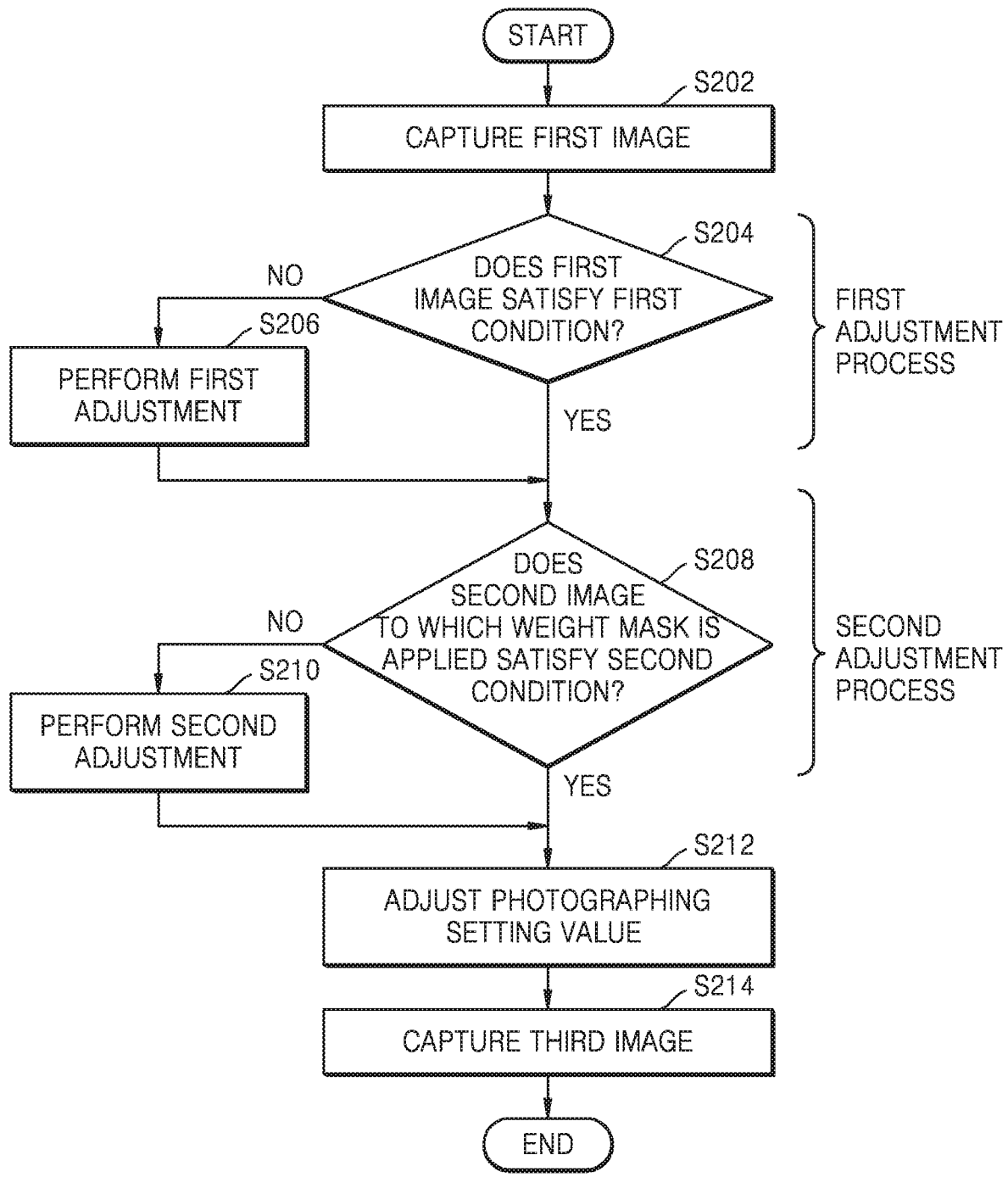
FIG. 2 is a flowchart for describing operations of the electronic device 100 according to an embodiment.

FIG. 2 is a flowchart for describing operations of the electronic device 100 according to an embodiment.

Operations of the electronic device 100 according to the disclosure may be performed when the processor 120 performs instructions stored in the memory 130 and controls the components of the electronic device 100.

The electronic device 100 may capture a first image by using the photographing device 110, in operation S202. The first image may include a region of interest. According to an embodiment, the first image may be captured by infrared photographing.

The region of interest may be a region including an object of interest. The object of interest may be determined according to a purpose of image capturing. The object of interest may be, for example, an iris, a face, a palm, a vein, a headlight of a vehicle, etc. The embodiments of the disclosure may be applied to various kinds of objects of interest and regions of interest, and the scope of rights of the claims is not limited by the kinds of objects of interest.

According to an embodiment, the electronic device 100 may capture the first image from image frames received successively. For example, the first image may be captured from a live-view image.

Then, the electronic device 100 may determine whether the first image satisfies a first condition, in operation S204. The electronic device 100 may determine whether the first image satisfies the first condition, based on pixel values of the entire area of the first image. For example, the electronic device 100 may determine whether the first image satisfies the first condition, based on a predetermined index value estimated from the pixel values of the first image.

According to an embodiment, the electronic device 100 may estimate a value representing exposure based on the pixel values of the entire area of the first image, and determine whether the value representing exposure satisfies the first condition. For this, the electronic device 100 may perform global estimation of an exposure value for the first image.

When the first image does not satisfy the first condition in operation S204, first adjustment for exposure may be performed, in operation S206. According to an embodiment, the electronic device 100 may adjust exposure based on a predetermined function for the first adjustment. Then, the electronic device 100 may adjust at least one photographing setting value according to the exposure adjusted through the first adjustment. According to another embodiment, the electronic device 100 may apply an exposure value adjusted after second adjustment is completed to the photographing setting value, instead of applying the exposure adjusted through the first adjustment immediately to the photographing setting value.

When the first image satisfies the first condition in operation S204, the exposure value for the first image may be maintained, and a photographing setting value at which the first image is captured may be maintained.

After the first adjustment process (operations S204 and S206) is completed, the electronic device 100 may apply a weight mask to the first image to generate a second image, and determine whether the second image satisfies a second condition, in operation S208. For example, the electronic device 100 may determine whether the second image satisfies the second condition, based on a predetermined value calculated from pixel values of the second image to which the weight mask has been applied.

According to an embodiment, a photographing setting value may be adjusted according to the photographing setting value determined by the first adjustment process (operations S204 and S206), and a 1-1-th image may be acquired based on the adjusted photographing setting value. The second adjustment process (operations S208 and S210) may be performed based on the 1-1-th image. In this case, the weight mask may be applied to the 1-1-th image to generate the second image. Also, the second adjustment on the photographing setting value may be performed based on the photographing setting value at which the 1-1-th image is acquired.

Figure 9:
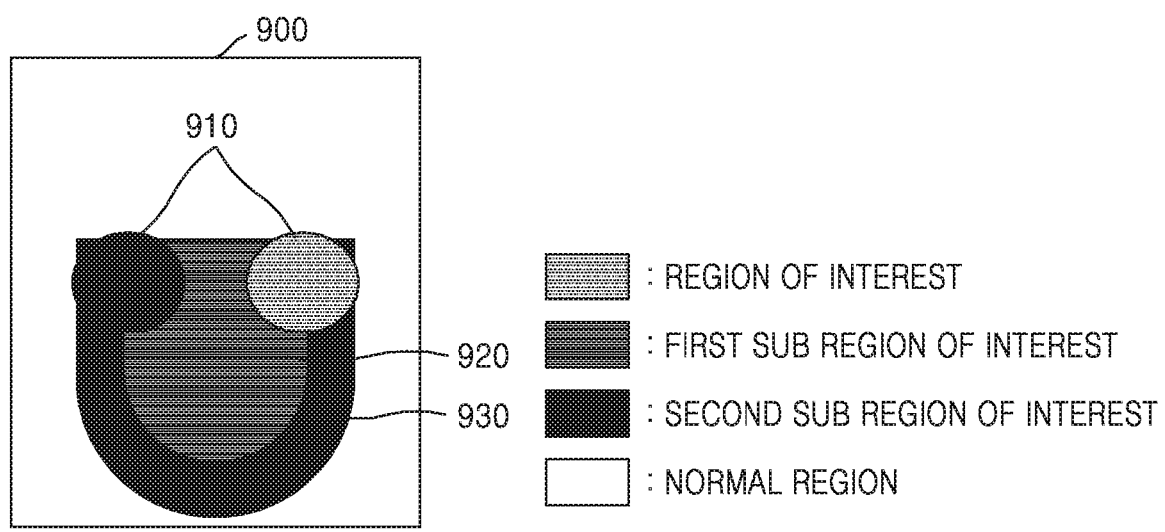
FIG. 9 shows a weight mask 900 according to an embodiment.

The weight mask may be a mask defining weights for the individual pixels of the first image. The weight mask may include a weight value set for each pixel or for each area composed of a plurality of pixels. The weight mask may be calculated based on the first image and a registration image registered in advance. The electronic device 100 may multiply a weight of each pixel of the weight mask by the corresponding pixel of the first image to generate the second image to which the weight mask is applied. An example of the weight mask is shown in FIG. 9.

In the weight mask according to an embodiment, a region of interest may have a higher weight than the other region. A region of interest may be defined by processing using the registration image, and include one or more regions.

When the second image generated by applying the weight mask to the first image does not satisfy the second condition in operation S208, the electronic device 100 may perform the second adjustment on the exposure and the photographing setting value. According to an embodiment, the electronic device 100 may adjust the exposure and the photographing setting value based on a predetermined function for the second adjustment. Then, the electronic device 100 may adjust a photographing setting value of the photographing device 110 according to the photographing setting value on which the second adjustment is performed, in operation S212.

When the second image satisfies the second condition in operation S208, exposure and a photographing setting value may be maintained as values determined in the first adjustment process (operations S204 and S206). That is, when the second image satisfies the second condition in operation S208, the exposure value for the first image may be maintained in the case in which the first image has satisfied the first condition in the first adjustment process (operations S204 and S206), and the exposure value on which the first adjustment is performed may be maintained in the case in which the first image has not satisfied the first condition and thus the first adjustment is performed.

The electronic device 100 may adjust at least one photographing setting value based on an exposure value determined after the first adjustment process (operations S204 and S206) and the second adjustment process (operations S208 and S210) are completed, in operation S212. The electronic device 100 may adjust the photographing setting value to correspond to the determined exposure value. A combination of photographing setting values may depend on a photographing mode of the electronic device 100. That is, the electronic device 100 may determine whether to preferentially adjust the aperture, to preferentially adjust the shutter speed, or to preferentially adjust sensitivity of the image pickup device, for an increase or decrease of an exposure value, according to a photographing mode.

When the adjustment of the photographing setting value is completed in operation S212, the electronic device 100 may apply the adjusted photographing setting value to the photographing device 110 to capture a third image, in operation S214. The processor 120 may control components, such as the aperture, the lens, the image pickup device, the shutter, etc., based on the adjusted photographing setting value. The third image may be an input frame input after the adjustment of the photographing setting value is completed. For example, the third image may be captured from an input frame for a live view.

The third image may be used for various purposes according to embodiments. According to an embodiment, the third image may include an iris region, and be used for iris authentication. Also, the third image may be used for various biometric authentications. According to another embodiment, the third image may be used to recognize a specific object. For example, the third image may be an image which includes a vehicle and of which exposure has been adjusted by setting a vehicle headlamp to an object of interest. In this case, the third image may be used to recognize vehicles.

Figure 3:
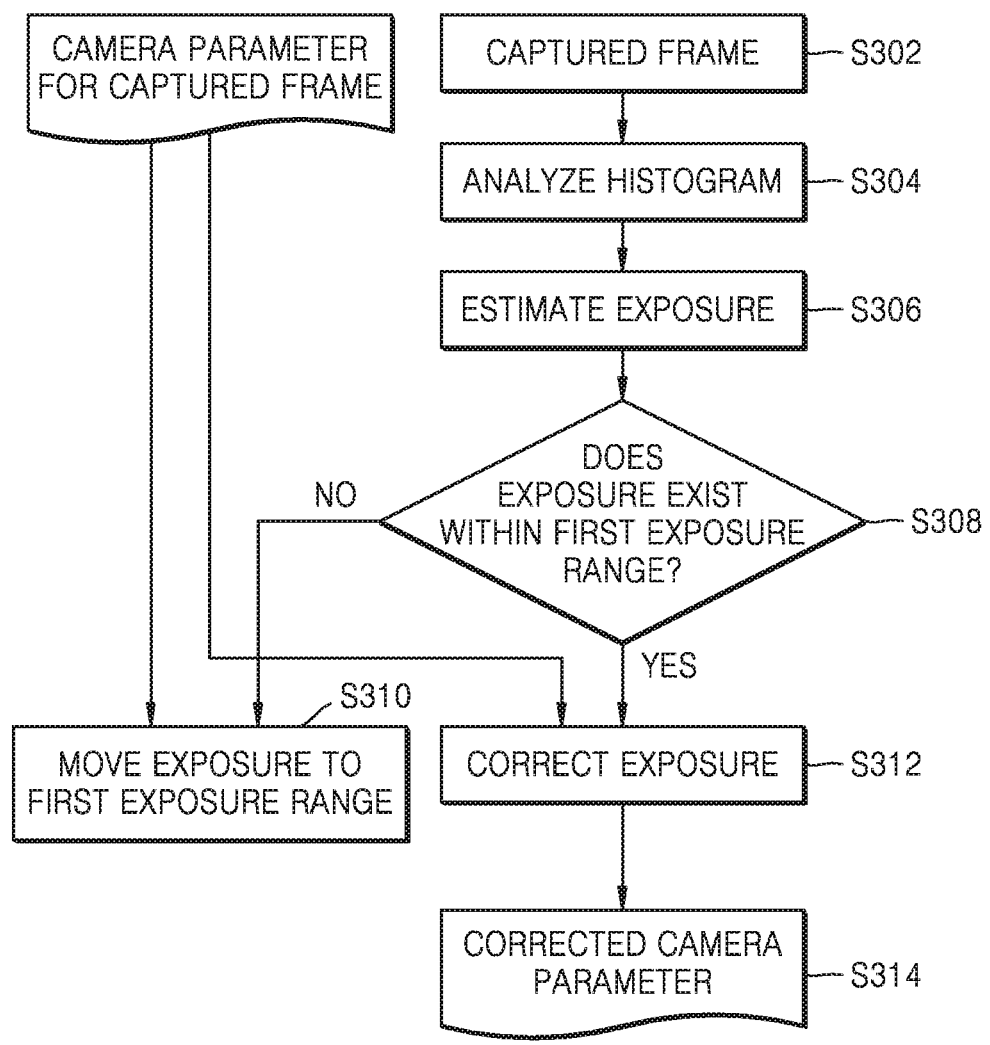
FIG. 3 shows operations of a first adjustment process according to an embodiment.

FIG. 3 shows operations of the first adjustment process according to an embodiment.

The electronic device 100 may generate a captured frame from a photographing signal of the photographing device 110, in operation S302. The captured frame may correspond to the first image. The processor 120 may generate a histogram for the first image, in operation S304.

Figure 4:
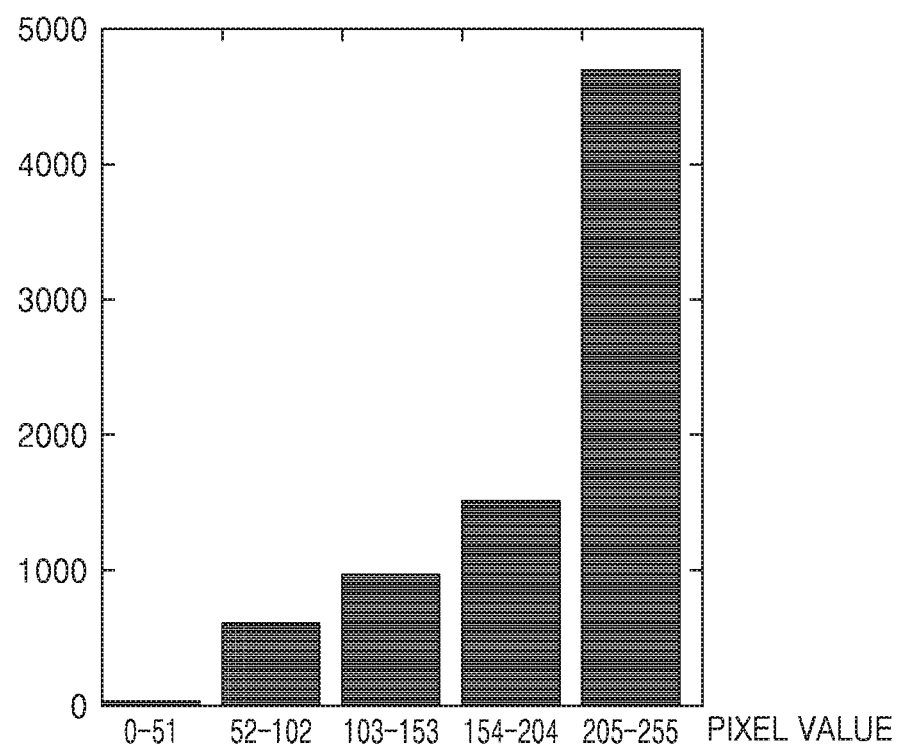
FIG. 4 shows a histogram of a first image generated according to an embodiment.

FIG. 4 shows the histogram of the first image generated according to an embodiment.

The electronic device 100 may set a plurality of intervals representing ranges of pixel values, and count a number of pixels corresponding to each of the plurality of intervals to generate the histogram shown in FIG. 4. According to an embodiment, a number of the plurality of intervals may have been set in advance, for example, experimentally. The plurality of intervals may have the same width or different widths.

Referring again to FIG. 3, the electronic device 100 may perform global exposure estimation, in operation S306. According to an embodiment, the electronic device 100 may calculate a universal illumination index (MSV) by using the histogram, and perform global exposure estimation by using the MSV.

The electronic device 100 may determine whether estimated global exposure exists within a first exposure range to determine whether the estimated global exposure satisfies the first condition, in operation S308. Whether the global exposure exists within the first range may correspond to the first condition.

When the estimated global exposure exists within the first range in operation S308, the electronic device 100 may adjust a first estimation value which is a result value of the first adjustment process, to correspond to a camera parameter for the captured frame corresponding to the first image, that is, a photographing setting value, in operation S312. The photographing setting value may be maintained as the photographing setting value at which the first image is captured.

When the estimated global exposure does not exist within the first range in operation S308, the electronic device 100 may adjust an exposure value such that the exposure value exists within the first exposure range, in operation S310.

The adjusted camera parameter or the adjusted exposure value may be determined as a result value of the first adjustment process, in operation S314.

Figure 5:
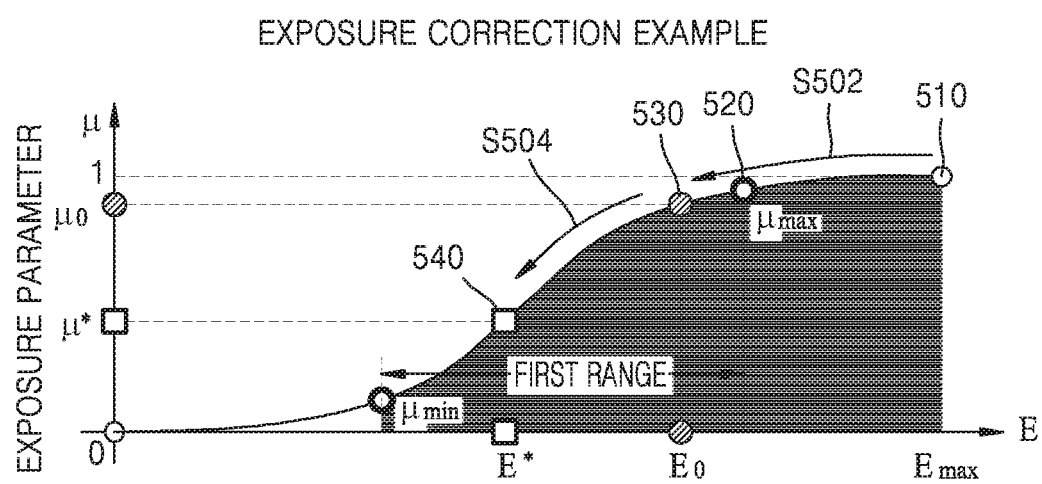
FIG. 5 shows a process of correcting an exposure value according to an embodiment.

FIG. 5 shows a process of correcting an exposure value according to an embodiment.

The electronic device 100 may adjust an exposure value such that a first estimation value for the exposure value belongs to a first range. The first range may correspond to a suboptimal exposure range. The first range may be defined by a minimum boundary value $\mu_{min}$ and a maximum boundary value $\mu_{max}$. The first range may include an optimal exposure value 540. According to embodiments of the disclosure, in the first adjustment, when the first estimation value deviates from the first range which is the suboptimal range, the exposure value may be first adjusted to be within the suboptimal range, instead of changing immediately to the optimal exposure value 540. Accordingly, the first adjustment may be performed within one frame without repetitive processing. For example, when an exposure value 510 estimated from the first image is out of the first range, the exposure value 510 may be adjusted to an exposure value A 530 to belong to the first range in the first adjustment process S502. The exposure value A 530 may be adjusted to the optimal exposure value 540 through a second adjustment process S504.

Embodiments of the disclosure may estimate an exposure value through two stages of the first adjustment process S502 and the second adjustment process S504, and avoid repetitive processing while reducing a processing time for exposure adjustment by using a weight mask providing a high weight to a region of interest in the second adjustment process S504.

Figure 6:
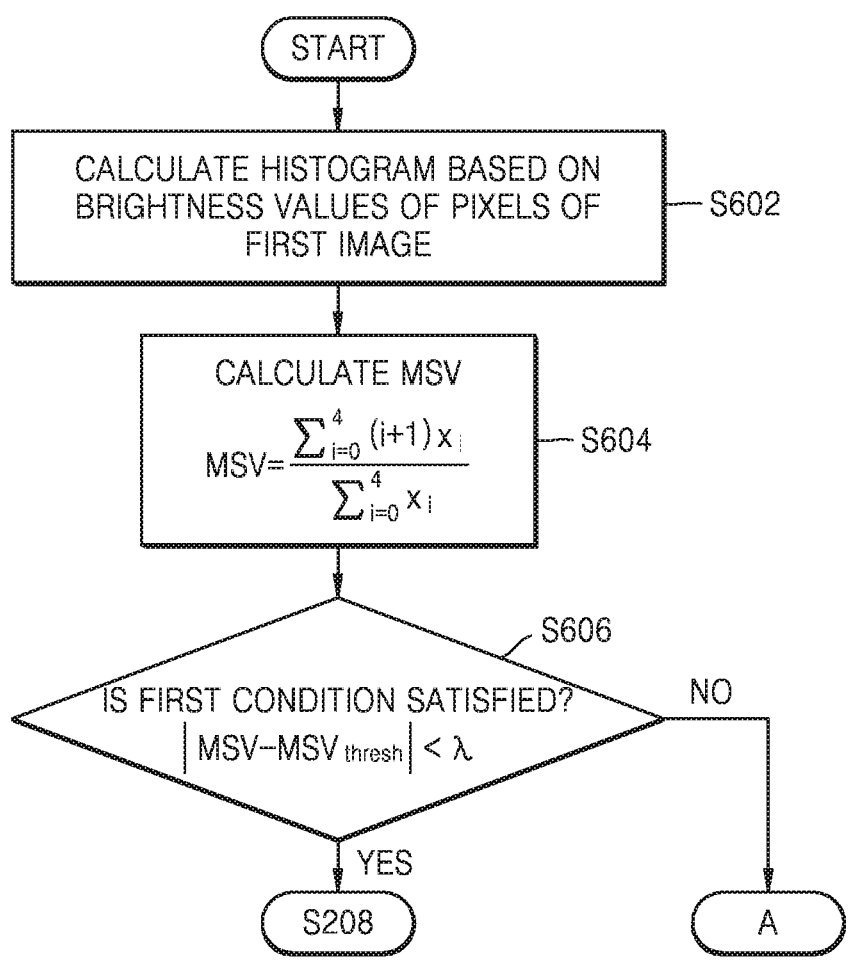
FIGS. 6 and 7 are flowcharts showing the first adjustment process according to an embodiment.
Figure 7:
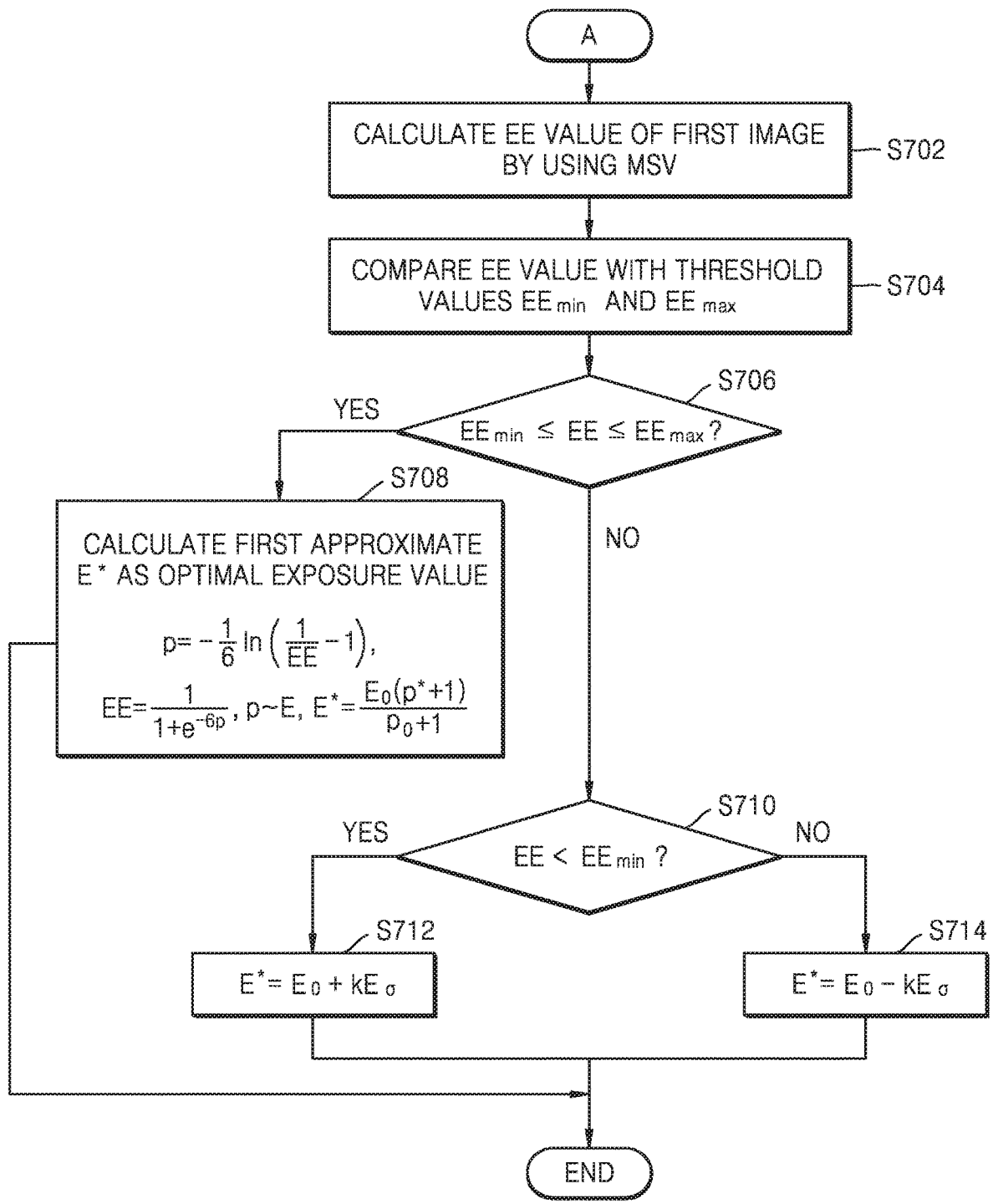

FIGS. 6 and 7 are flowcharts showing the first adjustment process according to an embodiment.

The electronic device 100 may calculate a histogram based on brightness values of pixels of a first image, in operation S602. The electronic device 100 may count, based on 5 intervals equally distributed in a range of brightness values 0 to 255, a number of image pixels for each interval, of which brightness values belong to the interval, thereby calculating a histogram of the first image. A number of the intervals may be a predetermined value, and may be set experimentally. Also, a number of the intervals may be any value in a range of 2 to 256.

After the histogram is calculated, the electronic device 100 may calculate a first illumination index (MSV), in operation S604. The MSV may be calculated by Equation 1. Herein, the MSV may be the first illumination index, wherein $x_i$ is a number of pixels belonging to each interval of the histogram, i is an interval index, and $N_{interval}$ is a number of the intervals. The flowchart of FIG. 6 shows an embodiment in which the number of intervals is 5.

$$MSV = \frac{\sum_{i=0}^{N_{interval}} (i+1)x_i}{\sum_{i=0}^{N_{interval}} x_i} \qquad \text{Equation 1}$$

Then, the electronic device 100 may determine whether the first condition is satisfied, based on the first illumination index, in operation S606. According to an embodiment, the first condition may be defined by Equation 2. Wherein MSV is a first illumination index, $MSV_{thresh}$ is a predetermined threshold value of the first illumination index, and $\lambda$ is a predetermined threshold value for transition of a value for adjusting a photographing setting value from a suboptimal value to an optimal value. The $MSV_{thresh}$ and $\lambda$ may have been experimentally determined in advance. For example, the $MSV_{thresh}$ and $\lambda$ may be set by analyzing statically significant sample images. For example, as analysis results for statically significant sample images for iris recognition, a value of 3.4 has been obtained for the $MSV_{thresh}$ and a value of 0.7 has been obtained for the $\lambda$. However, the values are exemplary, and, in other application examples than iris recognition, different specific threshold values for statically meaningful samples may be obtained. Also, the scope of rights of claims of the disclosure is not limited by the specific threshold values.

$$|MSV - MSV_{thresh}| < \lambda \qquad \text{Equation 2}$$

When the first condition is satisfied, the first estimation value E* which is a result of the first adjustment process may be determined as the exposure value at which the first image has been captured, and the first adjustment process may terminate.

When the first condition is not satisfied, the first adjustment process may proceed to A of FIG. 7.

When the first condition is not satisfied, the electronic device 100 may calculate an estimated exposure value EE of the first image by using the first illumination index MSV, in operation S702. The estimated exposure value EE may be calculated by Equation 3.

$$EE = \frac{MSV - 1}{4} \qquad \text{Equation 3}$$

Then, the electronic device 100 may compare the estimated exposure value EE to $EE_{min}$ and $EE_{max}$, in operation S704. Thereafter, the electronic device 100 may determine whether the estimated exposure value EE belongs to a second range, in operation S706. The second range may be greater than or equal to the $EE_{min}$ or smaller than or equal to the $EE_{max}$. The second range may correspond to a suboptimal range of exposure values. The $EE_{min}$ and $EE_{max}$ may be predetermined values, and may be predetermined threshold values experimentally or empirically determined through analysis of generally meaningful samples for images.

Then, when the estimated exposure value EE belongs to the second range in operation S706, the electronic device 100 may calculate a first estimation value E* for an optimal exposure value based on Equations 4 to 6. Herein, $E_0$ is an exposure value of the first image, and may be acquired from camera settings set when the first image is captured. p* may be a relative optimal exposure value depending on the camera settings set when the first image is captured, and $p_0$ may be a relative current value of the first image depending on the camera settings set when the first image is captured.

$$p = -\frac{1}{6}\ln\left(\frac{1}{EE} - 1\right) \qquad \text{Equation 4}$$

$$EE = \frac{1}{1 + e^{-6p'}} p - E \qquad \text{Equation 5}$$

$$E^* = \frac{E_o(p^* + 1)}{p_0 + 1} \qquad \text{Equation 6}$$

Accordingly, the first estimation value E* which is an output of the first adjustment process may be calculated by Equation 6.

When the estimated exposure value EE does not belong to the second range in operation S706, the electronic device 100 may determine whether the estimated exposure value EE is smaller than the $E_{min}$, in operation S710.

When EE<$E_{min}$, the first estimation value E* may be calculated by Equation 7.

$$E^* = E_O + kE_o \qquad \text{Equation 7}$$

Wherein $E_o$ is a predetermined exposure correction factor, and may be set empirically by analyzing generally significant sample images. A constant k, which is a natural number (k∈[1 . . . N]), may be a number of times by which an exposure adjustment operation is repeated until the estimated exposure value EE belongs to the second range. That is, the constant k may be a value depending on an input image, that is, the first image.

When EE>$E_{min}$, the first estimation value E* may be calculated by Equation 8, in operation S714.

$$E^* = E_O - kE_o \qquad \text{Equation 8}$$

The first estimation value E* which is an output of the first adjustment process may be determined as described above with reference to FIGS. 6 and 7. The first estimation value E* may be an approximate value for an optimal exposure value, and may be a suboptimal exposure value.

Figure 8:
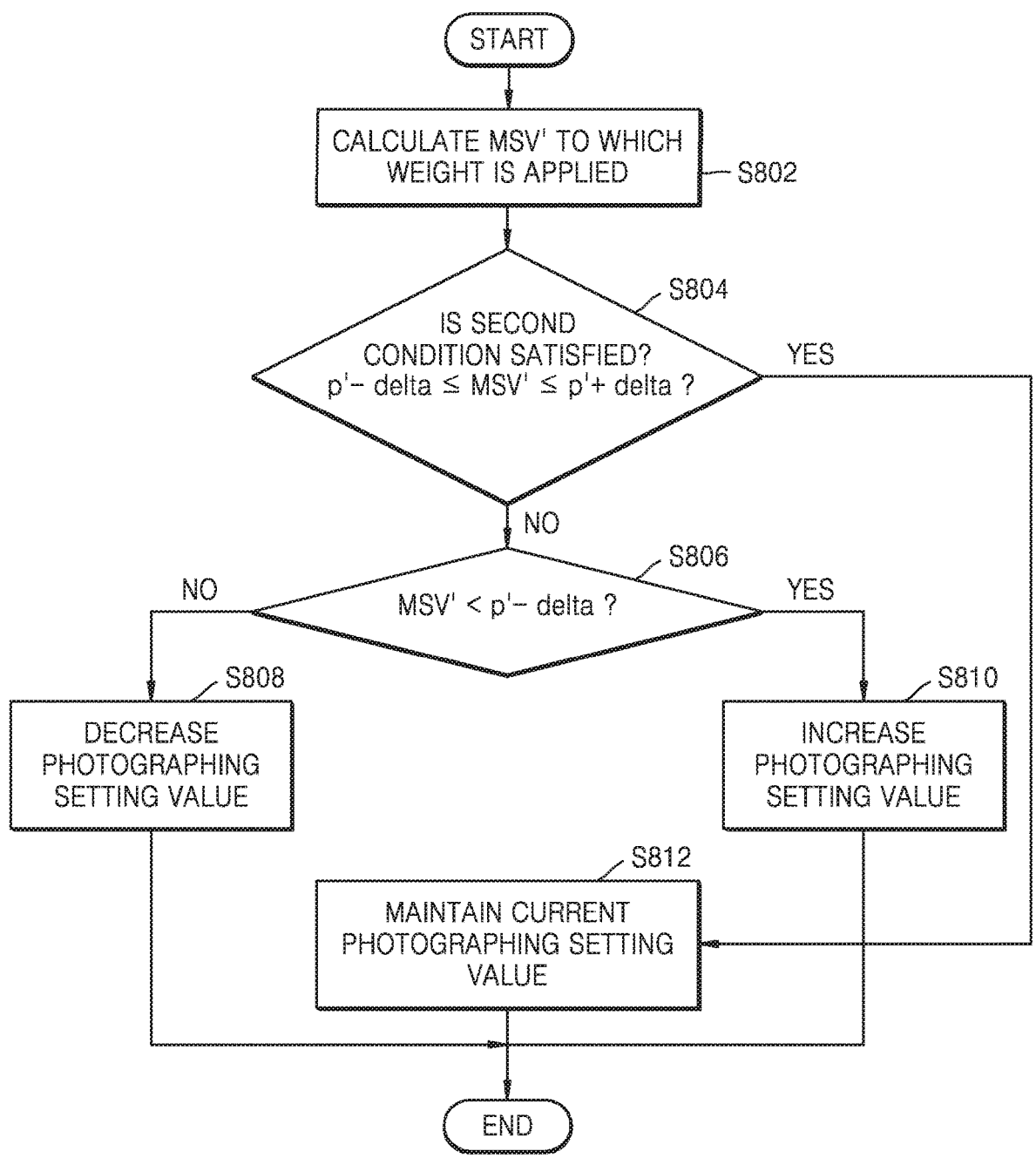
FIG. 8 is a flowchart showing operations of a second adjustment process according to an embodiment.

FIG. 8 is a flowchart showing operations of the second adjustment process according to an embodiment.

When the first adjustment process terminates, the second adjustment process may be executed.

First, the electronic device 100 may apply the weight mask to the first image to generate the second image, and then calculate a second illumination index MSV' by using the second image, in operation S802. The second illumination index MSV' to which weights have been applied may be calculated by using Equation 1 from the second image, similarly to the first illumination index MSV. That is, the electronic device 100 may obtain a histogram of the second image, and put the histogram of the second image to Equation 1 to calculate the second illumination index MSV'.

Then, the electronic device 100 may determine whether the second condition is satisfied based on the second illumination index MSV', in operation S804. The second condition may be set to Equation 9.

$$p'-\text{delta} \leq MSV' \leq p'+\text{delta} \qquad \text{Equation 9}$$

Wherein p' is an index, and delta defines a boundary of an interval at which an image of highest quality has been captured. The p' and delta may be calculated by several stages, and a process of calculating the p' and delta will be described in detail with reference to FIG. 10, later.

When the second condition is not satisfied in operation S804, the electronic device 100 may determine whether a third condition is satisfied, in operation S806. The third condition may be Equation 10.

$$MSV' < p'-\text{delta} \qquad \text{Equation 10}$$

When the third condition is not satisfied in operation S806, the electronic device 100 may adjust at least one photographing setting value to decrease exposure, in operation S808. For example, the electronic device 100 may decrease an exposure value and a gain value.

When the third condition is satisfied in operation S806, the electronic device 100 may adjust at least one photographing setting value to increase exposure, in operation S810. For example, the electronic device 100 may increase an exposure value and a gain value.

The at least one photographing setting value adjusted in operations S808 and S810 may be used to capture the next frame, that is, a third image.

When the second condition is satisfied in operation S804, a current photographing setting value may be maintained in operation S812. The current photographing setting value may be determined as an optimal photographing setting value.

In operations S808, S810 and S812, the current photographing setting value may be a photographing setting value adjusted according to the first estimation value E* determined by the first adjustment process. That is, operations S808 and S810 may increase or decrease the current photographing setting value adjusted according to the first estimation value E*, and operation S812 may maintain the photographing setting value adjusted according to the first estimation value E*.

To provide an optimal exposure value, at least one camera setting selected from among a group composed of an exposure time, a gain, a pulse width, a current intensity, and a pulse delay may be adjusted. The exposure time may be a time interval for which an area of a photosensitive material or a photosensitive matrix is exposed to light. The gain may provide amplification of a signal from a camera sensor. The current intensity may be a magnitude of current that is supplied to a predetermined component. The pulse width may be a time for which current is supplied to the predetermined component to provide a single pulse. The pulse delay may be a time delay between two successive pulses (during a time for which no current is supplied to the predetermined component). According to a preferred embodiment, settings (exposure time and gain) of two cameras may be adjusted to provide an optimal exposure value.

According to an embodiment, a camera parameter and an algorithm parameter may include adjustable parameters and predetermined constant parameters. The algorithm parameter may be a parameter that is used in an algorithm for performing a control method of an electronic device according to embodiments of the disclosure. The camera parameter may include an exposure value, a gain, a pulse width, a pulse delay, and current. The exposure value and the gain may be adjustable parameters, and the pulse width, the pulse delay, and the current may be parameters having constant values. The algorithm parameter may include CE (current exposure value), CG (current gain value), E Min (minimum exposure value), E Max (maximum exposure value), G Min (minimum gain value), G Max (maximum gain value), ED (exposure discrete), and GD (gain discrete). Herein, the CE and CG may be adjustable parameters, and the E Min, E max, G Min, and G Max may be parameters having constant values. In the current embodiment, when the electronic device 100) increases a photographing setting value, the exposure value may be adjusted to a value of Equation 11, and the gain may be adjusted to a value of Equation 12. By the adjustment, exposure may increase so that brightness of a captured image may increase.

$$\text{Exposure Value} = CE + ED \quad \text{Equation 11}$$

$$\text{Gain Value} = CG + GD \quad \text{Equation 12}$$

Also, when the electronic device 100 decreases a photographing setting value, the exposure value may be adjusted to a value of Equation 13, and the gain value may be adjusted to a value of Equation 14. By the adjustment, exposure may decrease so that brightness of a captured image may decrease.

$$\text{Exposure} = CE - ED \quad \text{Equation 13}$$

$$\text{Gain} = CG - GD \quad \text{Equation 14}$$

FIG. 9 shows a weight mask 900 according to an embodiment.

According to an embodiment, the weight mask 900 may include a region of interest 910. The region of interest 910 may be a region including an object of interest.

In the weight mask 900 according to an embodiment, the region of interest 910 may have a higher weight than the remaining region. The region of interest 910 may include one or more regions.

According to an embodiment, the weight mask 900 may include the region of interest 910, a sub region of interest 920 and 930, and a normal region. The normal area may be the remaining region not belonging to the region of interest 910 and the sub region of interest 920 and 930. In the embodiment, the region of interest 910 may have a highest weight, the sub region of interest 920 and 980 may have a weight that is lower than that of the region of interest and higher than that of the normal region, and the normal region may have a lowest weight. For example, when the object of interest is an iris, the region of interest 910 may be an iris region, the sub region of interest 920 and 930 may be a face region, and the normal region may be the remaining region except for the face.

The sub region of interest 920 and 930 may be defined as one or more regions. When the sub region of interest 920 and 930 includes a plurality of regions, the plurality of regions may have different weights. According to an embodiment, when the sub region of interest 920 and 930 includes a plurality of regions, the first sub region of interest 920 of the plurality of regions, being adjacent to the region of interest 910, may have a high weight, and the second sub region of interest 930 being far away from the region of interest 910 may have a low weight. According to another embodiment, a region including an object having high color similarity to the object of interest among the plurality of sub regions of interest 920 and 930 may have a higher weight than the remaining sub region of interest.

According to an embodiment, the region of interest 910 may be an iris region. The first sub region of interest 920 may be a region including a nose and a lip among the remaining region except for the region of interest 910. The second sub region of interest 920 may be a region corresponding to the face among the remaining region except for the region of interest 910 and the first sub region of interest 920.

Numbers, shapes, arrangements and weights of the region of interest 910 and the sub region of interest 920 and 920 may be determined variously according to embodiments.

Figure 10:
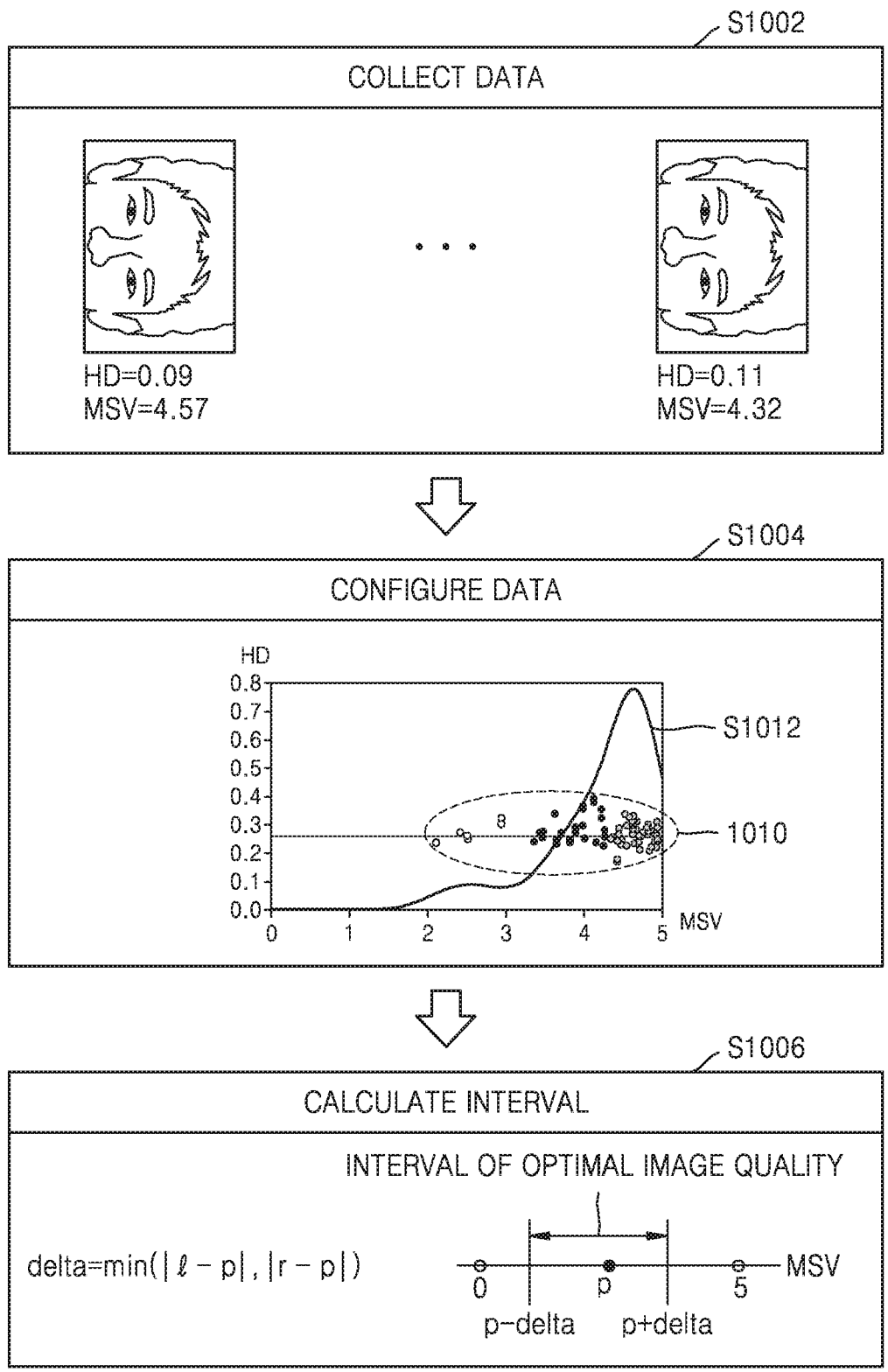
FIG. 10 is a flowchart showing a process of determining p' and delta of FIG. 8.

FIG. 10 is a flowchart showing a process of determining the p' and delta of FIG. 8.

Images of different users and related information may be collected, in operation S1002. A pairwise dissimilarity score (also referred to as a hamming distance (HD)) may be calculated for a plurality of sets of previously collected face images of the different users, captured in different optical conditions. A mask of a face region may be calculated in advance, and a MSV may be determined for each verification image. Accordingly, HD and MSV values may be acquired for each verification image. Herein, a verification image means a captured image captured for generating a mask.

Then, data representing the HD and MSV values may be configured, in operation S1004. The electronic device 100 may show a cluster of points representing the HD and MSV values to acquire a degree of HD-MSV dependence. A set 1010 of points may be clustered into a predetermined number of clusters (for example, 3 clusters) by using, for example, a k-means method. However, a number of clusters may be determined variously according to embodiments. According to an embodiment, the electronic device 100 may acquire a degree of HD-MSV dependence through a graph 1012 representing a density of HD values with respect to MSV values.

Then, a distribution density of f points of the clusters may be configured, and an interval p' may be calculated, in operation S1006. The interval p' may be determined by Equation 11.

$$p' = \arg\max(f) \quad \text{Equation 15}$$

That is, the p' may correspond to an argument of a distribution function maximum. The interval p' according to a preferred embodiment may be from 0 to 5. Then, a cluster of highest density (useful) may be determined from among the three clusters, and boundaries (left and right boundaries may be expressed as l and r, respectively) of the cluster may be defined. Then, the delta may be determined by Equation 12.

$$delta=(|l-p|,|r-p|) \quad \text{Equation 16}$$

According to an embodiment, the delta may be [0.1;0.5].

Figure 11:
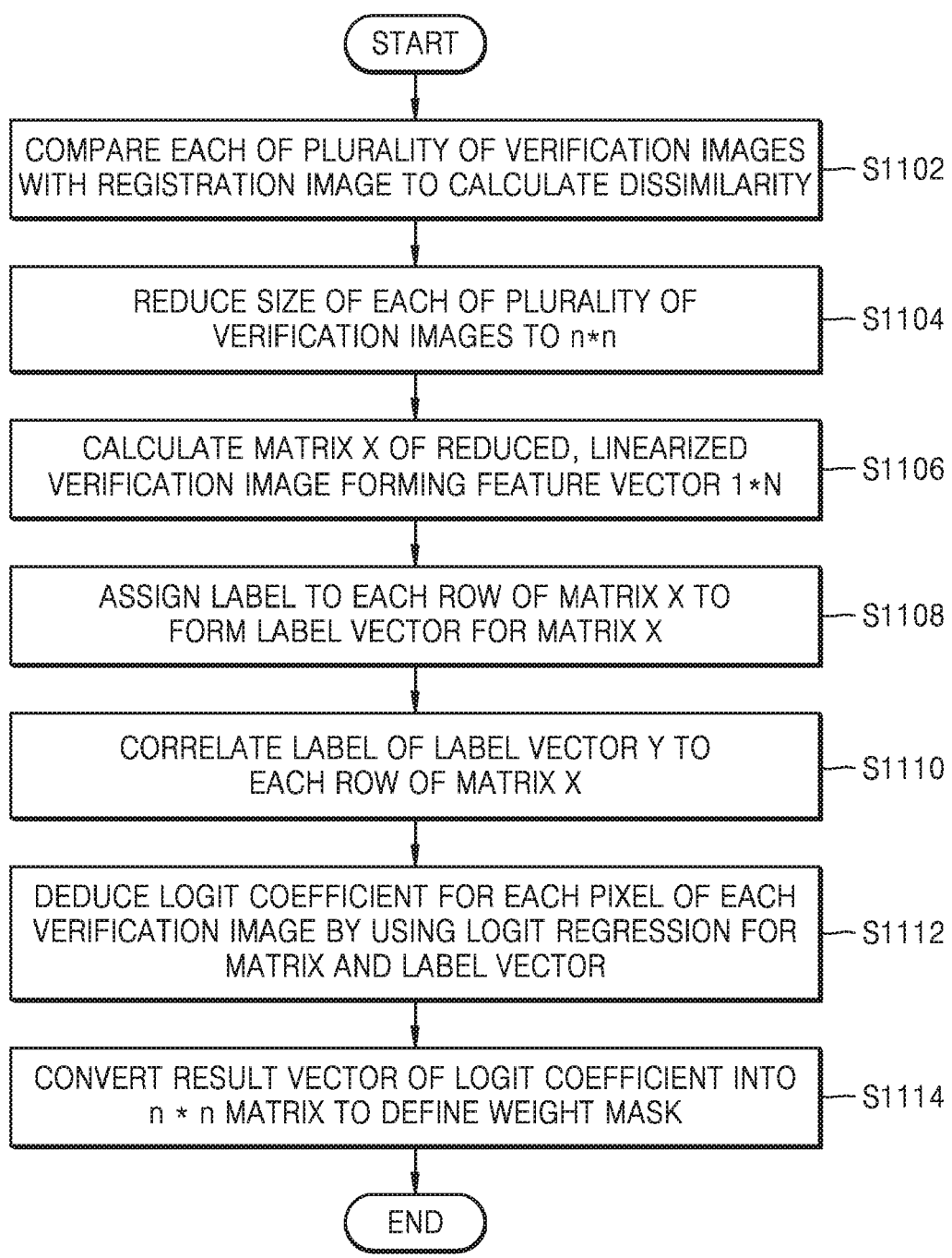
FIG. 11 is a flowchart showing a process of generating a weight mask according to an embodiment.

FIG. 11 is a flowchart showing a process of generating a weight mask according to an embodiment.

The weight mask may be a mask for assigning a high weight to a region of interest including an object of interest, and a shape of the weight mask, an arrangement of the region of interest, and weights may be determined depending on the object of interest. In the present specification, a case in which an object of interest is an iris and a region of interest and a sub region of interest of a weight mask are arranged in a face region will be described. However, the scope of rights of the claims of the present application is not limited to the embodiment, and includes all cases in which the weight mask is used for various kinds of objects of interest.

The weight mask may assign a higher weight to the region of interest. For example, in the case of iris recognition, a higher weight may be assigned to an eye region. The embodiments of the present disclosure may locally correct camera exposure to be suitable for a region of interest by using the weight mask, when user biometric authentication is performed, thereby increasing a success rate of the user biometric authentication.

According to an embodiment, a set of previously collected face images of different users, captured under different optical conditions, may be used to calculate a weight mask. According to an embodiment, two sets of face images may be used. For example, a first set of face images may be a set of previously collected face images of different users, captured by an infrared camera under outdoor lighting, and a second set of face images may be a set of previously collected face images of different users, captured by an infrared camera under indoor lighting. In this way, by calculating a weight mask of a face region from data of sets of face images photographed under different lighting conditions, it may be possible to increase a success rate of user biometric authentication through the iris even under difficult lighting conditions (for example, a dark room or bright sunlight). According to an embodiment, operations shown in FIG. 11 may be performed by processing the face images previously collected for each user based on the sets of the faces images acquired from the different users.

The sets of the previously collected face images described above may be used as a registration image in the embodiment of the disclosure. The registration image may be an image that is used to define a region of interest when a weight mask is generated. According to an embodiment, the registration image may be a plurality of images, and may include, for example, a registration image for indoor and a registration image for outdoor. When a plurality of registration images are used, the electronic device 100 may selectively use the registration images according to a surrounding environment, a kind of a subject, etc. According to an embodiment, an image registered in advance in the electronic device 100 by a user for iris authentication may be used as a registration image.

A verification image may be a captured user image that is used for user biometrics by being compared to the user's registration image. The verification image may be captured during each verification procedure. The verification image may be a plurality of frames input in real time.

The registration image and the verification image may be stored in the memory 130 of the electronic device 100.

When a plurality of verification images are received, the electronic device 100 may compare each of the plurality of verification images to a registration image to calculate dissimilarity, in operation S1102. According to an embodiment, the dissimilarity may be acquired by calculating a hamming distance (HD) between each of the plurality of verification images and the registration image. A process of calculating dissimilarity will be described in more detail with reference to FIG. 12.

Figure 12:
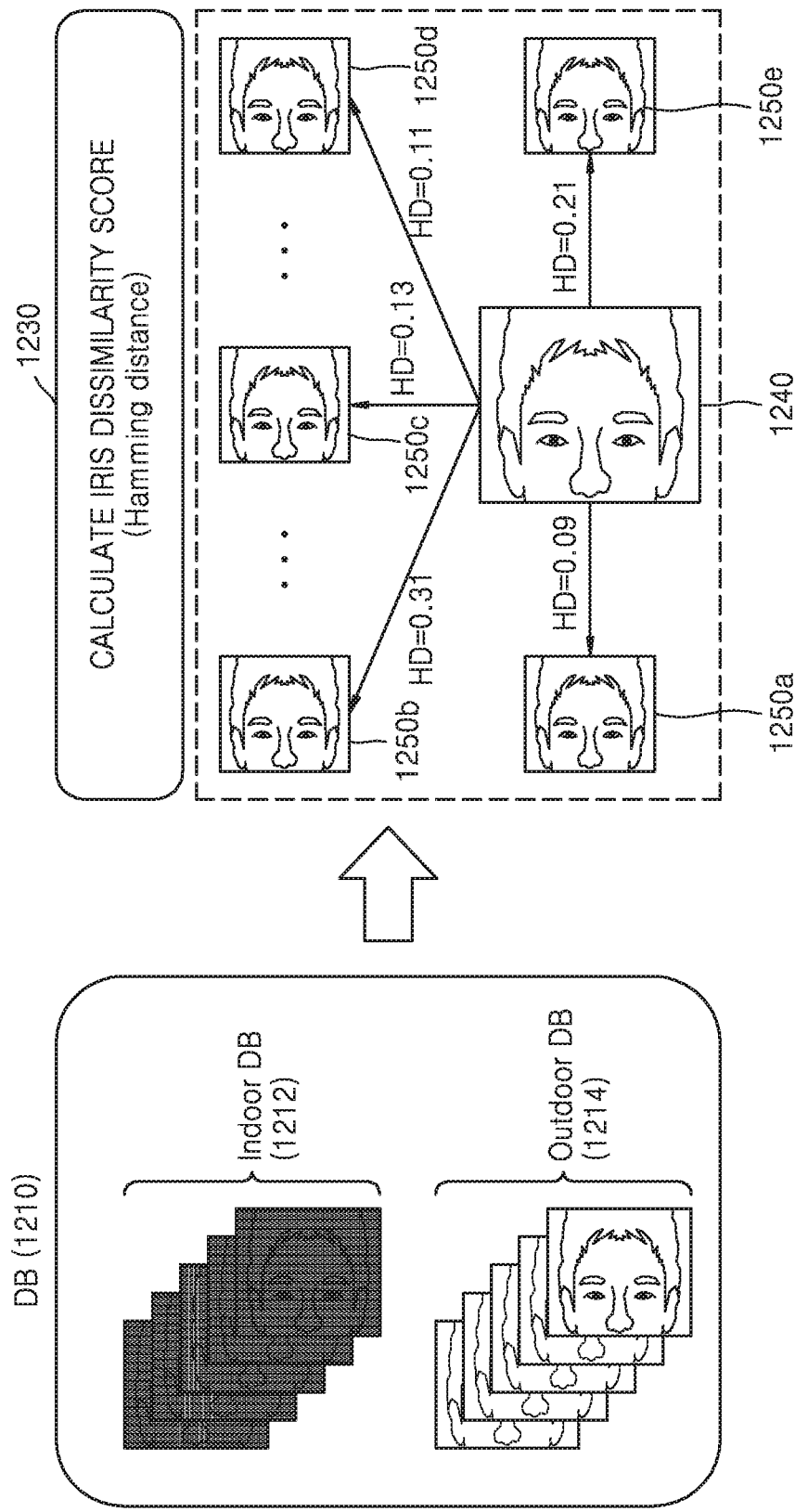
FIG. 12 is a flowchart showing a process of calculating dissimilarity according to an embodiment.

FIG. 12 is a flowchart showing a process of calculating dissimilarity according to an embodiment. In FIG. 12, an embodiment of iris recognition will be described.

According to an embodiment, each of a plurality of verification images 1250a, 1250b, 1250c, 1250d, and 1250e may be compared to at least one registration image 1240 to calculate a dissimilarity score representing iris dissimilarity, in operation 1230. Iris dissimilarity may correspond to a hamming distance HD between two images that are compared to each other. Iris dissimilarity may be calculated based on pairwise irises.

According to an embodiment, DB 1210 may include indoor DB 1212 and outdoor DB 1214. Also, in each of the indoor DB 1212 and outdoor DB 1214, registration images for a plurality of users may be stored. The DB 1210 may be implemented in the memory 130. In a registration image sequence for each user, a plurality of frames may be stored. For example, 50 frames or less may be stored in the registration image sequence. Also, the DB 1210 may include information about ground truth, information about a lighting condition of each registration image, information about an auto-exposure state of each registration image, etc.

According to an embodiment, the registration image may be an infrared image.

Hereinafter, operations S1104, S1106, S1108, S1110, and S1112 of FIG. 11 will be described with reference to FIG. 13.

Figure 13:
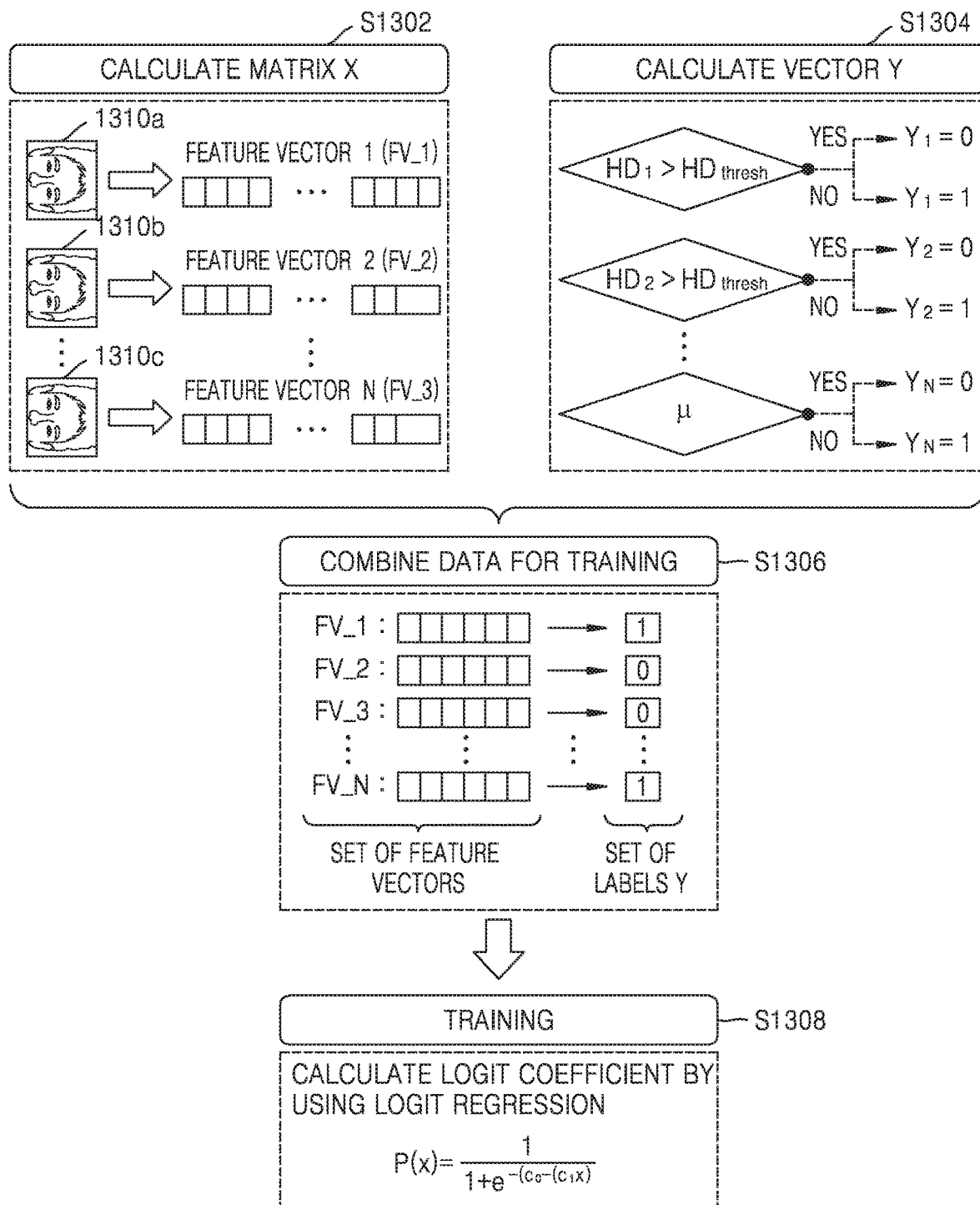
FIG. 13 shows a process of generating a weight mask according to an embodiment.

FIG. 13 shows a process of generating a weight mask according to an embodiment.

After dissimilarity is calculated, each of the plurality of verification images may be reduced to a size of n*n, that is, a square size of a predetermined size to generate reduced verification images 1310a, 1310b, and 1310c, in operation S1104. According to an embodiment, each of the plurality of verification images may have a size of 1920*1920, and each of the reduced verification images 1310a, 1310b, and 1310c may have a size of 200*200. The size of n*n may be determined variously according to embodiments. Also, the reduced size is not limited to having a square shape, and the present disclosure includes an embodiment in which each verification image is reduced to a rectangle.

The size reduction may save calculation resources of a device for performing precalculation of a weight mask and resources of a user computing device to which the weight mask is to be applied. However, operation S1104 of reducing the sizes of the verification images is not essential, and may be omitted.

Then, the electronic device 100 may generate feature vectors $FV\_1, FV\_2, FV\_3, \ldots, FV\_N$ for the respective reduced verification images 1310a, 1310b, and 1310c, in operation S1106. The feature vectors $FV\_1, FV\_2, FV\_3, \ldots, FV\_N$ may be a matrix resulting from arranging pixel values of the reduced verification images 1310a, 1310b, and 1310c in the form of 1*N. The reduced verification images 1310a, 1310b, and 1310c may be linearized to the feature vectors $FV\_1, FV\_2, FV\_3, \ldots, FV\_N$. N may correspond to a total number of pixels of each of the reduced verification images 1310a, 1310b, and 1310c. That is, when each of the reduced verification images 1310a, 1310b, and 1310c has a size of n*n, N=n*n. According to an embodiment, each of the reduced verification images 1310a, 1310b, and 1310c may have a size of 200*200, and the feature vectors FV_1, FV_2, FV_3, . . . , FV_N may have a size of 1*40000. The electronic device 100 may generate a matrix X of which rows are the feature vectors FV_1, FV_2, FV_3, . . . , FV_N, in operation S1302.

Then, the electronic device 100 may assign a label to each row of the matrix X, in operation S1108. The electronic device 100 may define a label vector Y from a set of labels corresponding to each row of the matrix X, in operation S1304. When a hamming distance HD for a matrix row is greater than or equal to a threshold value $HD_{thresh}$, the electronic device 100 may assign a label "0" to the matrix row, and, when a hamming distance HD for a matrix row is smaller than the threshold value $HD_{thresh}$, the electronic device 100 may assign a label "1" to the matrix row. Also, the label values may be assigned conversely. The label vector Y may be defined by a matrix representing label values for each of the plurality of verification images.

After the label vector Y is determined, the electronic device 100 may correlate the label vector Y with the matrix X, in operation S1110. That is, the rows FV_1, FV_2, FV_3, . . . FV_N of the matrix X corresponding to the same verification image may be correlated to a label value or element of the label vector Y, in operation S1306.

Then, the electronic device 100 may deduce a logit coefficient for each pixel of each verification image (or each reduced verification image) by using logit regression for the matrix X and the label vector Y, in operation S1112. A process of deducing the logic coefficient may include a training process using the matrix X and the label vector Y. Each logit coefficient may reflect an importance score of a pixel for successful user verification. The logit regression may be performed by Equation 17, in operation S1308. Wherein P(x) is a logit coefficient of each pixel, $c_0$ and $c_i$ are predetermined constants, and x is a value of an element of the vector X.

$$P(x) = \frac{1}{1 + e^{*(c_0 + c_1 x)}} \qquad \text{Equation 17}$$

Then, the electronic device 100 may convert a result vector of the logit coefficient into a n*n matrix to define a weight mask, in operation S1114. A process of defining the weight mask will be described in detail with reference to FIG. 14.

Figure 14:
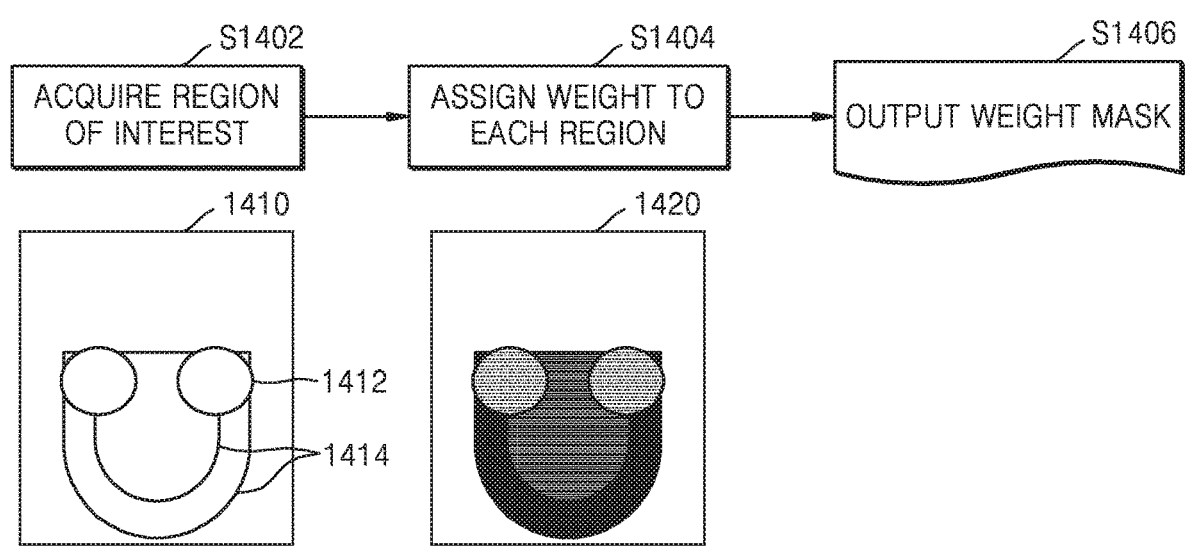
FIG. 14 shows a process of defining a weight mask according to an embodiment.

FIG. 14 shows a process of defining a weight mask according to an embodiment.

Result vectors of logit coefficients may be converted into a logit coefficient matrix of the same size as a reduced verification image. For example, when a reduced verification image has a size of 200*200, a logit coefficient matrix may also have a size of 200*200. The electronic device 100 may acquire a region of interest of a weight mask from the logic coefficient matrix to acquire a weight mask 1410 in which a region of interest 1412 is defined, in operation S1402. Also, a sub region of interest 1414 may be defined from the weight mask.

Then, the electronic device 100 may assign a weight to each region of the weight mask), in operation S1404. The electronic device 100 may assign a highest weight to the region of interest 1412 of a plurality of regions of the weight mask. Also, the electronic device 100 may assign a weight that is lower than that assigned to the region of interest 1412 and higher than that assigned to a normal region, to the sub region of interest 1414. In this way, by assigning a weight to each region of the weight mask, a weight mask 1420 may be generated and output, in operation S1406. The weight mask 1420 may be output in various forms, such as a n*n matrix, a 1*n matrix, etc.

A weight mask may be calculated by the electronic device 100. According to another embodiment, a weight mask may be calculated by an external device, and the calculated weight mask may be input to the electronic device 100. When a weight mask is calculated by an external device, the processing load and processing complexity of the electronic device 100 may be reduced, and accordingly, design load of the electronic device 100 may be reduced.

The embodiments of the disclosure may be applied to various kinds of recognition or authentication systems. Embodiments to which the embodiments of the disclosure are applied will be described with reference to FIGS. 15 to 19.

Figure 15:
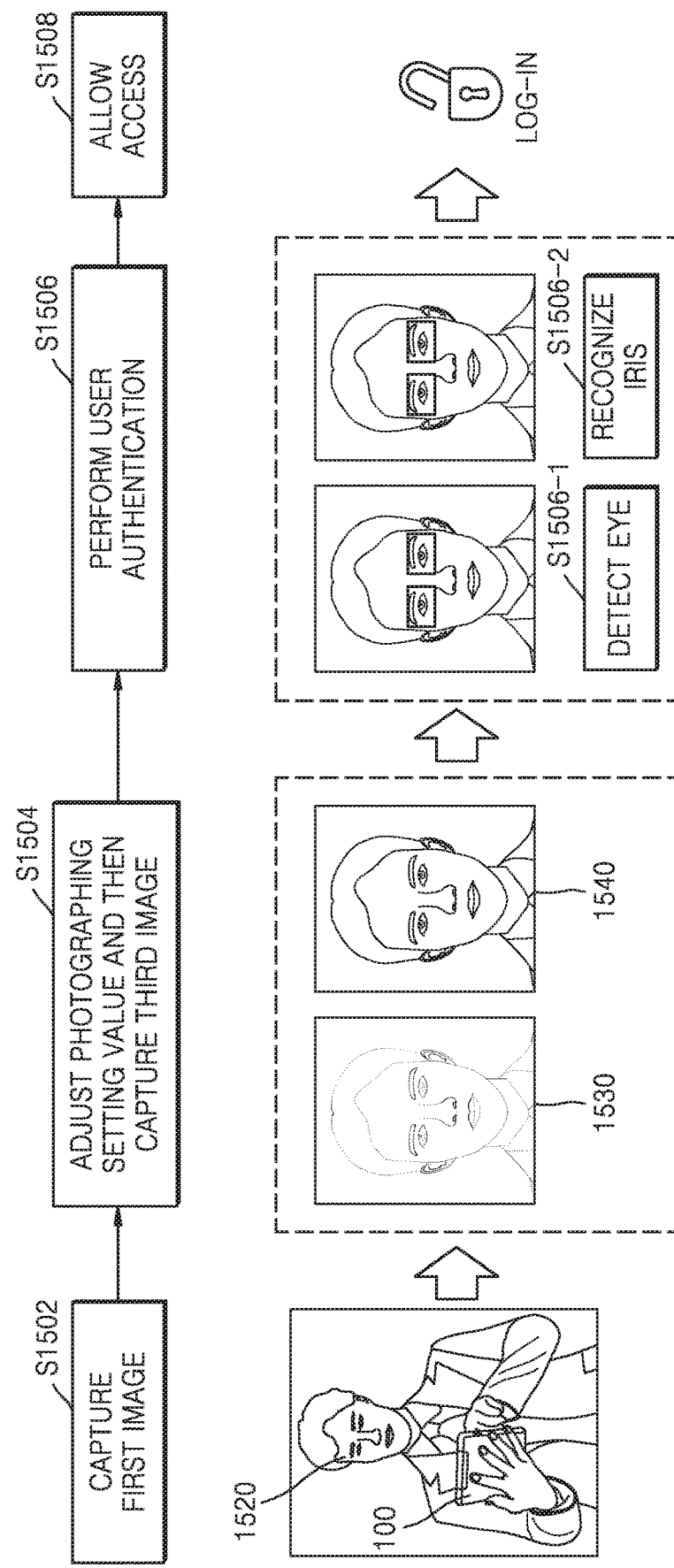
FIG. 15 shows a configuration for performing iris authentication according to an embodiment.

FIG. 15 shows a configuration for performing iris authentication according to an embodiment.

According to an embodiment, exposure correction according to embodiments of the disclosure may be used for iris authentication. First, the electronic device 100 may capture a first image including an iris of a user 1520, in operation S1502.

Then, the electronic device 100 may adjust a photographing setting value by using exposure correction through the first adjustment process and the second adjustment process, and then capture a third image, in operation S1504. For example, the electronic device 100 may perform exposure correction based on the first image 1530 to capture the third image 1540.

Then, the electronic device 100 may perform iris authentication from the third image 1540, in operation S1506. The electronic device 100 may detect an eye from the third image 1540, in operation S1506-1, and recognize and authenticate an iris, in operation S1506-2. The iris authentication may be performed by using various iris authentication algorithms.

When the iris authentication is successful, the electronic device 100 may allow access of the user. For example, through iris authentication, the user may unlock the electronic device 100, log in a specific site, or activate a specific function of the electronic device 100.

Figure 16:
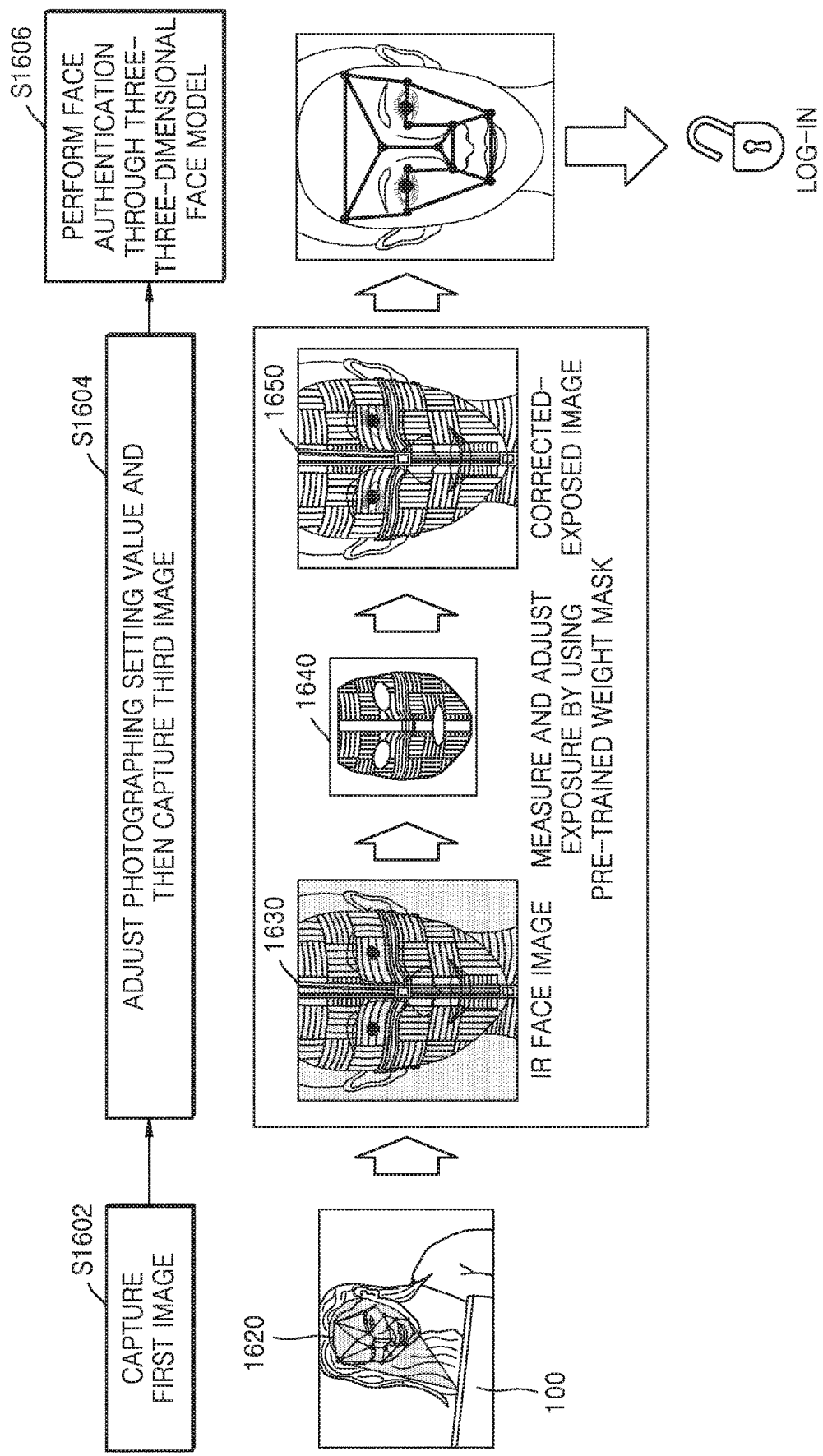
FIG. 16 is a view for describing a process for face authentication according to an embodiment.

FIG. 16 is a view for describing a process for face authentication according to an embodiment.

According to an embodiment, the exposure correction according to the embodiments of the disclosure may be used for face authentication. First, the electronic device 100 may capture a first image 1630 including a face of a user 1620, in operation S1602. The first image 1630 may be an infrared face image.

Then, the electronic device 100 may capture a third image 1650 through exposure correction, in operation S1604. The electronic device 100 may perform the second adjustment process by using a weight mask 1640 trained in advance to adjust a photographing setting value. The weight mask 1640 may include a pattern formed over a face region.

After the exposure correction is completed, the electronic device 100 may capture the third image 1650 by using the adjusted photographing setting value. In FIG. 16, the third image 1650 displayed together with the pattern of the weight mask 1640 is shown. However, according to another embodiment, a third image from which a pattern of a weight mask has been removed may be acquired.

Then, the electronic device 100 may perform face authentication by using the third image 1650 and a three-dimensional face model, in operation S1606. The face authentication may be performed by using various face authentication algorithms.

Figure 17:
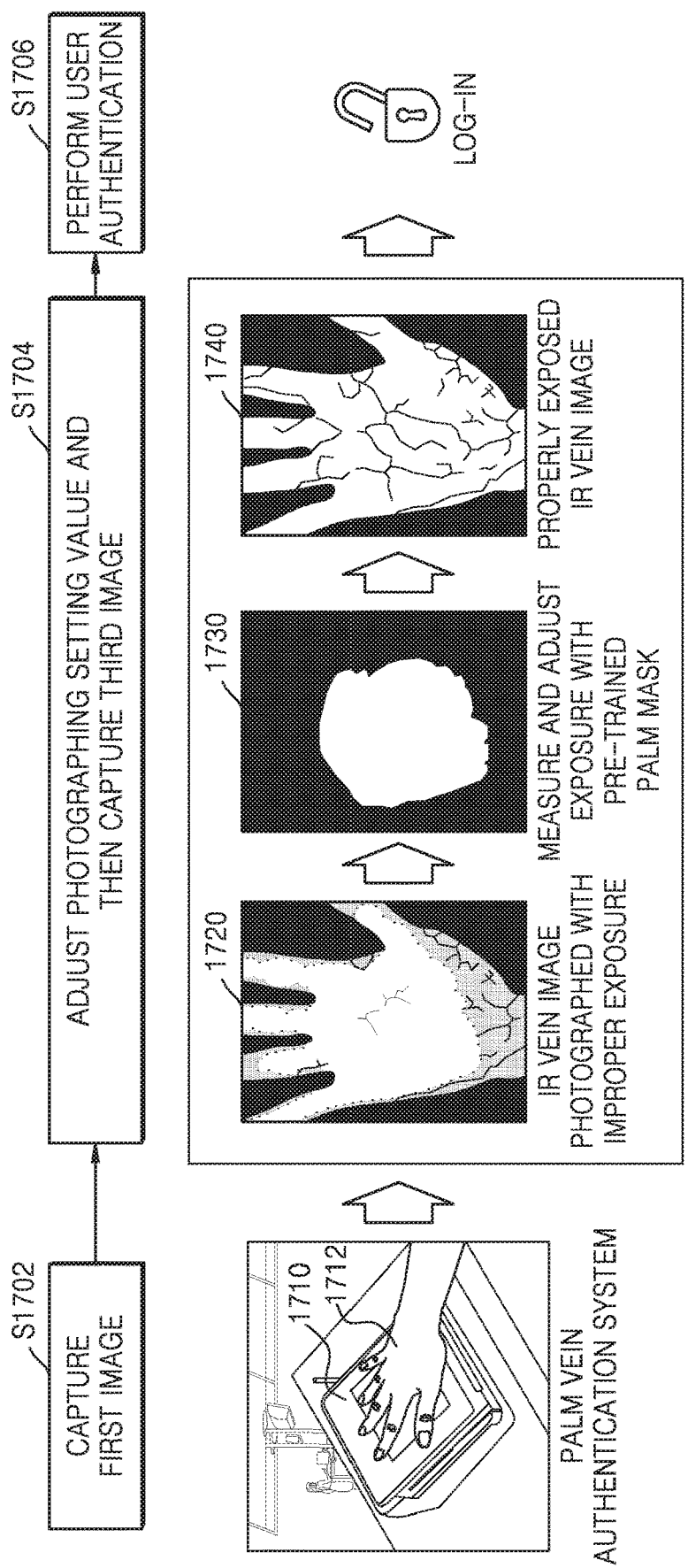
FIG. 17 is a view for describing a process for palm authentication according to an embodiment.

FIG. 17 is a view for describing a process for palm authentication according to an embodiment.

According to an embodiment, the exposure correction according to the embodiments of the disclosure may be used for palm authentication. First, the electronic device 100 may capture a first image 1720 including a user's palm, in operation S1702. The first image 1720 may be an infrared vein image of the palm. The electronic device 100 may be implemented in the form of a terminal 1710 configured to photograph the entire region of a user's palm and be capable of infrared photographing. The user may locate his/her hand 1712 around the terminal 1710 such that the palm faces a photographing surface of the terminal 1710 to obtain palm authentication.

Then, the electronic device 100 may capture a third image 1740 through exposure correction, in operation S1704. The electronic device 100 may perform the second adjustment process by using a weight mask 1730 trained in advance to adjust a photographing setting value. The weight mask 1730 may be configured such that a region of interest corresponding to the palm has a high weight.

After the exposure correction is completed, the electronic device 100 may capture the third image 1740 by using the adjusted photographing setting value. As shown in FIG. 17, by correcting exposure to be suitable for photographing a palm region and veins of the palm and then photographing the palm region and the veins of the palm, the third image 1740 may properly represent information about the palm and the veins of the palm.

Then, the electronic device 100 may perform palm authentication by using the third image 1740, in operation S1706. The palm authentication may be performed by using various palm authentication algorithms.

Figure 18:
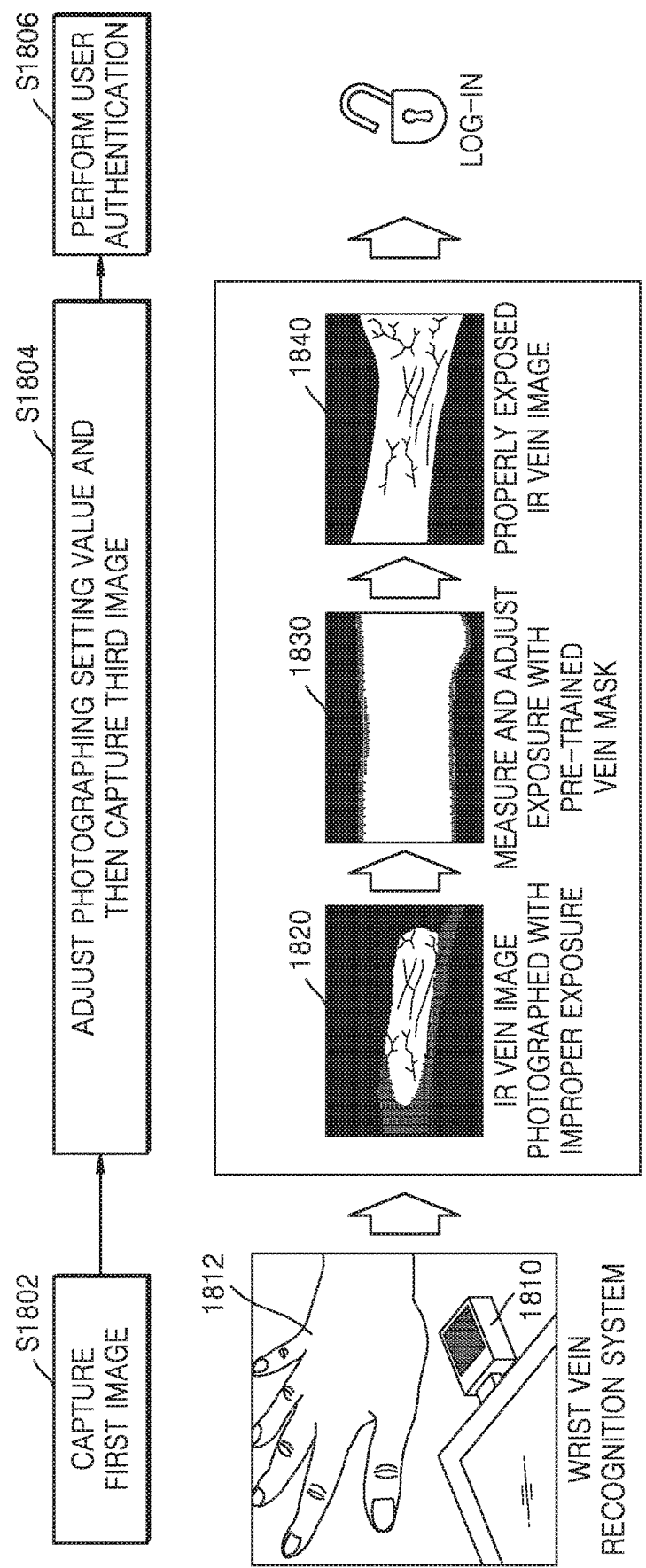
FIG. 18 is a view for describing a process for vein authentication according to an embodiment.

FIG. 18 is a view for describing a process for vein authentication according to an embodiment.

According to an embodiment, the exposure correction according to the embodiments of the disclosure may be used for vein authentication. FIG. 18 shows an embodiment of wrist vein authentication. First, the electronic device 100 may capture a first image 1820 including a user's veins, in operation S1802. The first image 1820 may be an infrared vein image of the wrist. The electronic device 100 may be implemented in the form of a terminal 1810 configured to photograph a user's wrist region and be capable of infrared photographing. The terminal 1810 may be detachably attached to another electronic device through an I/O interface. The user may locate his/her hand 1812 around the terminal 1810 such that the wrist faces a photographing surface of the terminal 1810 to obtain vein authentication.

Then, the electronic device 100 may capture a third image 1840 through exposure correction, in operation S1804. The electronic device 100 may perform the second adjustment process by using a weight mask 1830 trained in advance to adjust a photographing setting value. The weight mask 1830 may be configured such that a region of interest corresponding to a wrist has a high weight.

After the exposure correction is completed, the electronic device 100 may capture a third image 1840 by using the adjusted photographing setting value. As shown in FIG. 18, by correcting exposure to be suitable for photographing a wrist region and veins of the wrist and then photographing the wrist region and the veins of the wrist, the third image 1840 may properly represent information about the veins of the wrist.

Then, the electronic device 100 may perform vein authentication by using the third image 1840, in operation S1806. The vein authentication may be performed by using various vein authentication algorithms.

Figure 19:
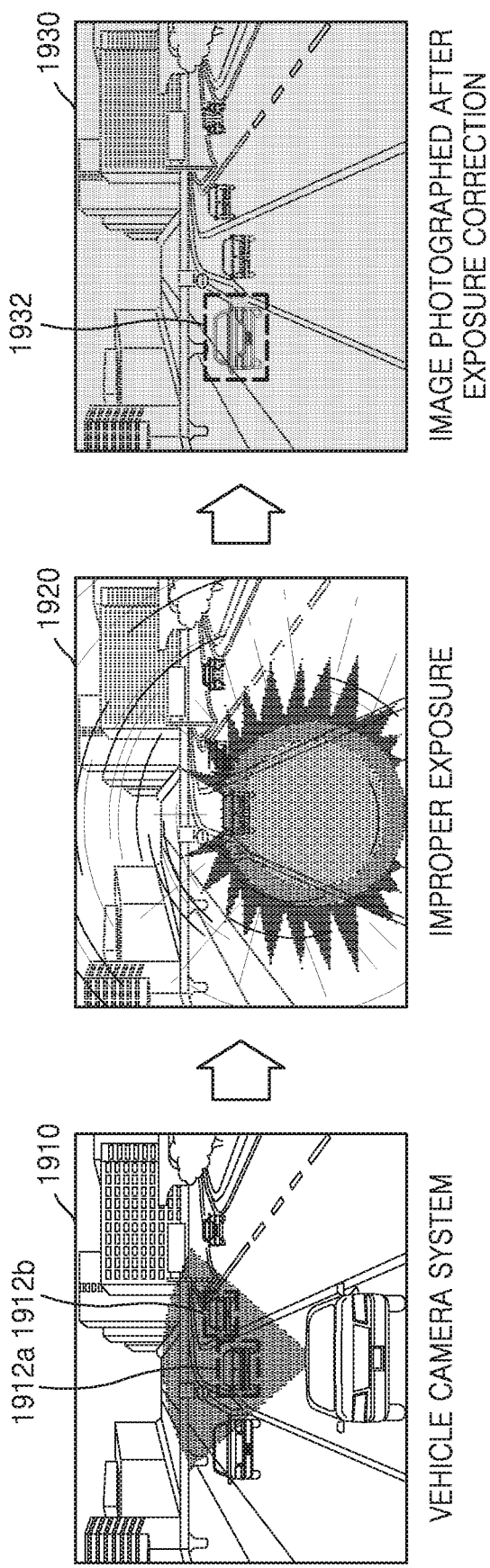
FIG. 19 shows a process of recognizing vehicles, according to an embodiment.

FIG. 19 shows a process of recognizing vehicles, according to an embodiment.

According to an embodiment, an exposure correction method according to embodiments of the disclosure may be applied to a camera system of a vehicle. A camera for photographing a surrounding environment around a vehicle may be applied to the vehicle. The vehicle may recognize other vehicles around the vehicle through images acquired by the camera to use information about the recognized other vehicles to control driving. For example, as shown in an image 1910, a vehicle may photograph a front view to recognize other vehicles 1912a and 1912b exiting in a front direction.

However, when improper exposure occurs in a field of view (FOV) of the camera included in the vehicle, a situation in which the vehicle fails to recognize other vehicles around the vehicle or wrongly recognizes other vehicles or a surrounding environment may occur. For example, as shown in an image 1920, when another vehicle having a high level of brightness of headlamps approaches the vehicle, improper exposure may occur so that a vehicle camera system may fail to recognize a front vehicle.

According to an embodiment, the vehicle camera system may perform the first adjustment process of the embodiments of the disclosure and perform the second adjustment process by using a mask in which a vehicle region or a vehicle headlamp region is set to a region of interest to perform exposure correction, thereby improving an exposure correction speed and a recognition success rate or recognition performance for other vehicles or a surrounding environment. For example, the vehicle camera system may perform exposure correction according to the embodiments of the disclosure to acquire a third image such as an image 1930, thereby successfully recognize a front vehicle 1932.

FIG. 20 is a view for describing recognition success rates in an electronic device according to embodiments of the disclosure.

In an iris recognition system to which the embodiments of the disclosure are not applied and an iris recognition system using the exposure correction according to the embodiments of the disclosure, numbers of false rejections and false rejection ratios (FRR) are shown. For convenience of description, a device to which the embodiments of the disclosure are not applied will be referred to as a first device, and the first device will be described as a comparative example. A device to which the embodiments of the disclosure are applied will be referred to as a second device. In a current experimental example, an iris image has been registered in both the first device and the second device under an indoor lighting condition. Also, under an incandescent lamp lighting condition, authentication trials for each user have been done 30 times, and at this time, infrared images acquired through infrared photographing have been used. According to the current experimental example, it is seen from FIG. 20 that, in the embodiments of the disclosure, numbers of false rejections for all of 10 users are significantly small. Also, it is confirmed that the comparison example shows a high false rejection ratio (FRR) of 82.3%, whereas the embodiments of the disclosure show a significantly low FRR of 1.6%.

Figure 21:
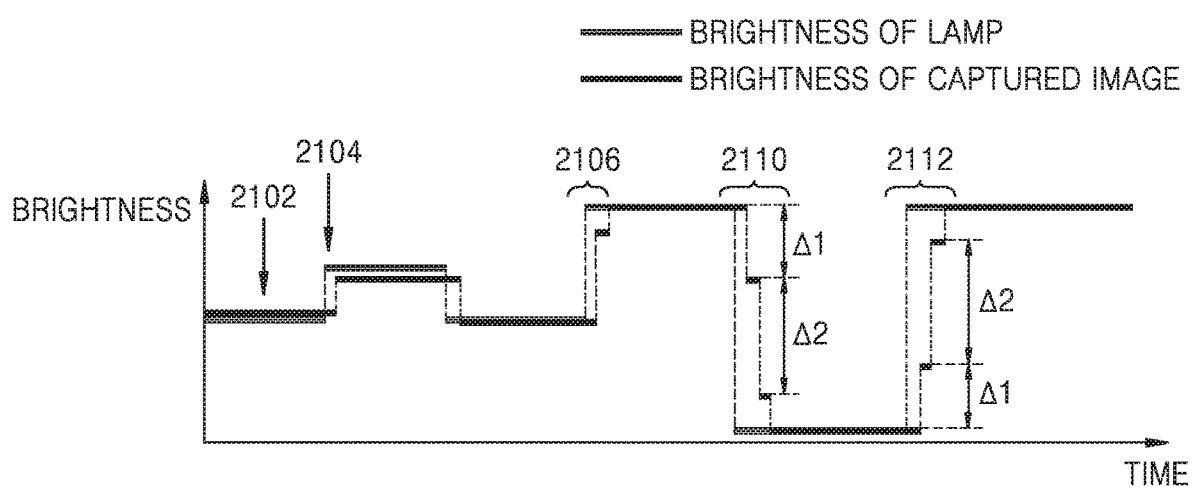
FIG. 21 is a graph showing changes in brightness of a captured image, according to an embodiment.

FIG. 21 is a graph showing changes in brightness of a captured image, according to an embodiment.

According to the current embodiment, it is confirmed that exposure correction is performed at very high speed. By successively capturing images while adjusting an intensity of lighting using a dimmable filament lamp capable of dimming brightness, the brightness of the lighting and the brightness of the captured images were measured. Also, the electronic device 100 performed exposure correction according to the current embodiment, while performing infrared photographing.

As results of the measurement, it was observed, as shown in FIG. 21, that the brightness of a captured image changes according to the brightness of the lamp. When a change in brightness is small, the embodiments of the disclosure may perform no exposure adjustment so that the brightness of a captured image may not change, in operation 2102. When a change in brightness is within a predetermined range, the brightness may change to a new brightness value determined by Equation 6. That is, brightness adjustment by the second adjustment process may be not performed. When a change in brightness deviates from the predetermined range, the brightness may change at high speed in stages, like sections 2106, 2110, and 2112. When a change in brightness deviates from the predetermined range, exposure may be adjusted in two stages of the first adjustment process and the second adjustment process. It is confirmed that, in the sections 2110 and 2112 in which a sharp change in brightness occurs, the second adjustment process is performed two times or more, so that a photographing setting value changes in three stages or more due to exposure correction. According to an embodiment, when a change in brightness is a predetermined value or more, the brightness may change to satisfy a relation of $\Delta_2 = 2*\Delta_1$. Even in a section, such as the sections 2110 and 2112, in which a sharp change in brightness occurs, final brightness may converge to a brightness value defined by Equation 6.

Figure 22:
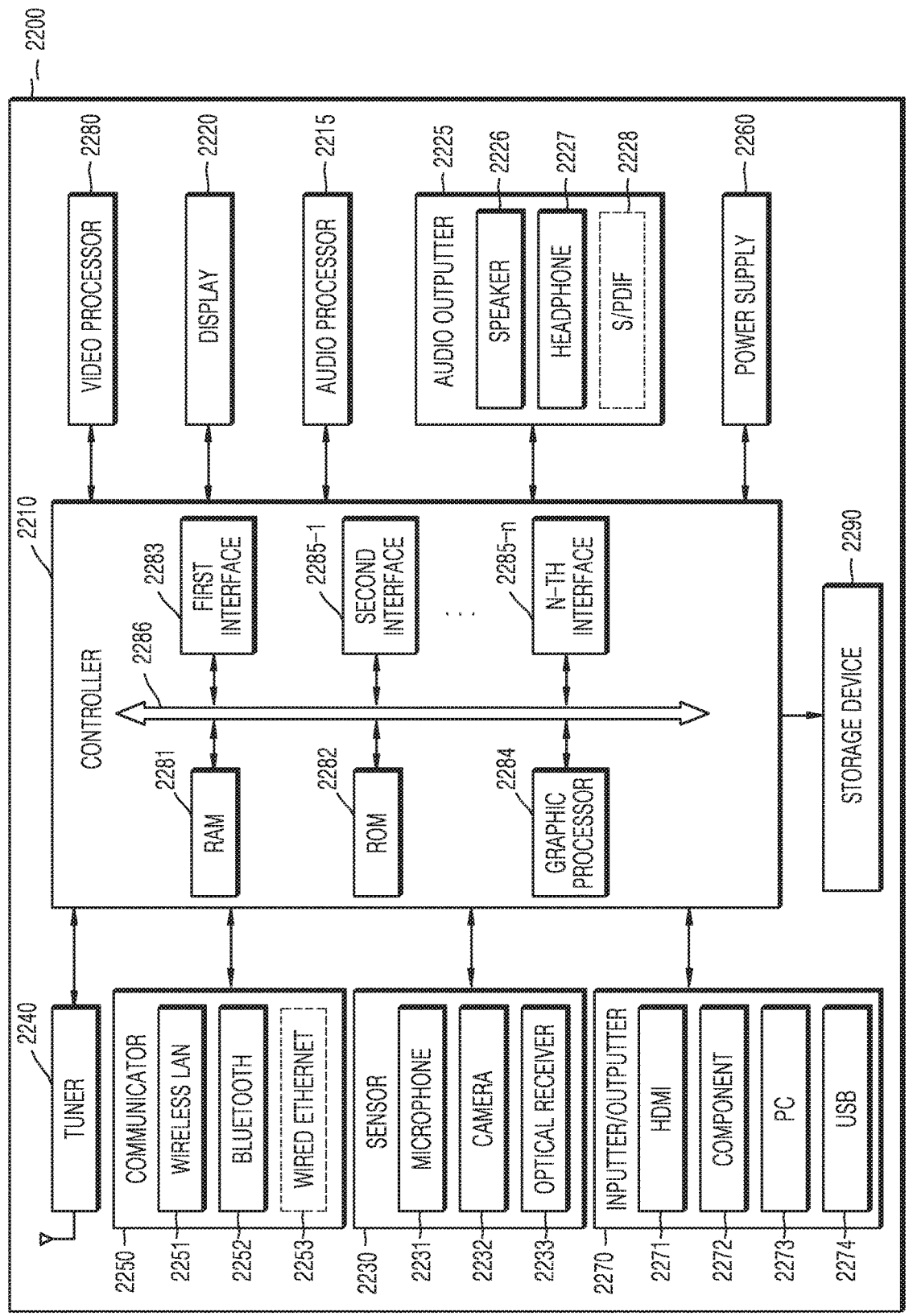
FIG. 22 is a block diagram showing a configuration of an electronic device 2200 according to an embodiment.

FIG. 22 is a block diagram showing a configuration of an electronic device 2200 according to an embodiment. The electronic device 2200 of FIG. 22 may be an embodiment of the electronic device 100 of FIG. 1.

Referring to FIG. 22, the electronic device 2200 according to an embodiment may include a tuner 2240, a controller 2210, a display 2220, a communicator 2250, a sensor 2230, an inputter/outputter 2270, a video processor 2280, an audio processor 2215, a storage device 2290, and a power supply 2260.

The tuner 2240 may amplify, mix, or resonate a broadcasting signal received in a wired or wireless fashion to tune and select only a frequency of a channel which the electronic device 1100 wants to receive from among a plurality of radio wave components. The broadcasting signal may include audio, video, and additional information (for example, electronic program guide (EPG)).

The tuner 2240 may receive a broadcasting signal from a frequency band corresponding to a channel number according to a user input (for example, a control signal received from a control device, for example, a channel number input, and a channel up/down input, a channel input made on an EPG screen).

The tuner 2240 may receive a broadcasting signal from various sources, such as terrestrial broadcasting, cable broadcasting, satellite broadcasting, internet broadcasting, etc. The tuner 2240 may receive a broadcasting signal from a source, such as analog broadcasting or digital broadcasting.

The communicator 2250 may transmit/receive data or a signal to/from an external device or a server by a control of the controller 2210. The controller 2210 may transmit/receive content to/from an external device connected through the communicator 2250, download an application from the external device, or perform web browsing. The communicator 2250 may transmit/receive data or a signal by at least one method of wireless LAN (for example, Wi-Fi) 2251, Bluetooth 2252, and wired Ethernet 2253 in correspondence to performance and a structure of the electronic device 2200.

The video processor 2280 may process video data received by the electronic device 2200. The video processor 2280 may perform various image processing (for example, decoding, scaling, noise filtering, frame rate conversion, resolution conversion, etc.) on video data.

The sensor 2230 may sense a user's voice, a user's image, or a user's interaction, and may include a microphone 2231, a camera 2232, and an optical receiver 2233.

The microphone 2231 may receive a voice uttered by a user. The microphone 2231 may convert the received voice into an electrical signal and output the electrical signal to the controller 2210. The user's voice may include, for example, a voice corresponding to a menu or function of the electronic device 2200.

The camera 2232 may receive an image (for example, successive frames) corresponding to a user's motion including a gesture made in a recognition range of the camera. The controller 2210 may select a menu displayed on the electronic device 2200 by using a recognition result of the received motion, or may perform a control corresponding to the recognition result of the motion.

The camera 2232 may correspond to the photographing device 110 of FIG. 1.

The optical receiver 2233 may receive an optical signal (including a control signal) from an external control device through a light window (not shown), etc. of a bezel of the display 2220. The optical receiver 2233 may receive an optical signal corresponding to a user input (for example, a touch, pressing, a touch gesture, a voice, or a motion) from a control device. A control signal may be extracted from the received optical signal by a control of the controller 2210.

The inputter/outputter 2270 may receive video (for example, a moving image, etc.), audio (for example, a voice, music, etc.), and additional information (for example, EPG, etc.) from the outside of the electronic device 2200 by a control of the controller 2210. The inputter/outputter 2279 may include one of a High-Definition Multimedia Interface (HDMI) port 2271, a component jack 2272, a PC port 2273, and a USB port 2274. The inputter/outputter 2279 may include a combination of the HDMI port 2271, the component jack 2272, the PC port 2273, and the USB port 2274.

The controller 2210 may perform a function of controlling overall operations of the electronic device 2200 and a signal flow between internal components of the display 2220 and processing data. When a user input is received or a pre-set, stored condition is satisfied, the controller 2210 may execute Operating System (OS) and various applications stored in the storage device 2290.

The controller 2210 may include Random Access Memory (RAM) 2281 that stores a signal or data received from the outside of the electronic device 2200 or is used as a storage area for various tasks performed in the electronic device 2200, Read Only Memory (ROM) 1782 in which a control program for controlling the electronic device 2200 is stored, and a processor 2283.

The controller 2210 may correspond to the processor 120 of FIG. 1.

The graphic processor 2284 may generate a screen including various objects, such as an icon, an image, text, etc., by using a calculator (not shown) and a rendering device (not shown). The calculator may calculate attribute values, such as coordinate values, shapes, sizes, colors, etc., of individual objects according to a layout of a screen by using a user input sensed through the sensor 2230. The rendering device may generate screens of various layouts including the objects, based on the attribute values calculated by the calculator. The screens generated by the rendering device may be displayed on a display area of the display 2220.

First to n-th interfaces 2285-1 to 2285-$n$ may be connected to various components described above. One of the interfaces 2285-1 to 2285-$n$ may be a network interface that is connected to an external device through a network.

The RAM 2281, the ROM 2282, the processor 2283, the graphic processor 2284, and the first to n-th interfaces 2285-1 to 2285-$n$ may be connected to each other through an internal bus 2286.

The display 2220 may convert an image signal, a data signal, an OSD signal, a control signal, etc., processed by the controller 2210 to generate a driving signal. The display 2220 may be implemented as a plasma display panel (PDP) display, a liquid crystal display (LCD), an organic light emitting diodes (OLED) display, a flexible display, etc., and also may be implemented as a 3-dimensional (3D) display. Also, the display 2220 may be configured as a touch screen and used as an inputter as well as an outputter.

The audio processor 2215 may process audio data. The audio processor 2215 may perform various processing, such as decoding, amplification, noise filtering, etc., on audio data. Meanwhile, the audio processor 2215 may include a plurality of audio processing modules for processing audio corresponding to a plurality of content.

The audio outputter 2225 may output audio included in a broadcasting signal received through the tuner 2240 by a control of the controller 2210. The audio outputter 2225 may output audio (for example, a voice or sound) received through the communicator 2250 or the inputter/outputter 2270. Also, the audio outputter 2225 may output audio stored in the storage device 2290 by a control of the controller 2210. The audio outputter 2225 may include at least one of a speaker 2226, a headphone output terminal 2227, or a Sony/Philips Digital Interface (S/PDIF) output terminal 2228. The audio outputter 2225 may include a combination of the speaker 2226, the headphone output terminal 2227, and the S/PDIF output terminal 2228.

The power supply 2260 may supply power received from an external power source to internal components inside the electronic device 2200 by a control of the controller 2210. Also, the power supply 2260 may supply power output from a single or one or more batteries (not shown) located inside the electronic device 2200 to the internal components by a control of the controller 2210.

The storage device 2290 may store various data, a program, or an application for driving and controlling the electronic device 2200 by a control of the controller 2210. The storage device 2290 may include a broadcast receiving module, a channel control module, a volume control module, a communication control module, a voice recognition module, a motion recognition module, a light receiving module, a display control module, an audio control module, an external input control module, a power control module, a power control module of an external device connected in a wireless fashion (for example, Bluetooth), voice database (DB), or motion database (DB), which are not shown. The modules (not shown) and database of the storage device 2290 may be implemented in the form of software (S/W) to perform a broadcast reception control function, a channel control function, a volume control function, a communication control function, a voice recognition function, a motion recognition function, a light reception control function, a display control function, an audio control function, an external input control function, a power control function, or a power control function of an external device connected in a wireless fashion (for example, Bluetooth), in the electronic device 2200. The controller 2210 may perform the individual functions by using the software stored in the storage device 2290.

The storage device 2290 may correspond to the memory 130 of FIG. 1.

Meanwhile, the block diagrams of the electronic devices 100$a$ and 2200 shown in FIGS. 2 and 3 are block diagrams for embodiments. Some components included in the individual block diagrams may be integrated or omitted, or another component may be added, according to actual specifications of the electronic devices 100 and 2200. That is, two or more components may be integrated into one component, or one component may be separated into two or more components, as necessary. Also, functions performed in the individual blocks are provided to describe the embodiments, and the detailed operations or devices for the functions do not limit the scope of rights of the disclosure.

The control method of the electronic device according to an embodiment may be embodied in the form of program commands that can be executed through various computing means, and recorded in computer-readable media. The computer-readable media may also include, alone or in combination with the program commands, data files, data structures, and the like. The program commands recorded on the media may be those specially designed and constructed for the present disclosure, or they may be of the kind well-known and available to those having skill in the computer software arts. Examples of the computer-readable media include magnetic media such as hard disks, floppy disks, and magnetic tape; optical media such as compact disc read only memory (CD-ROM) disks and digital video disks (DVDs); magneto-optical media such as floptical disks; and hardware devices that are specially configured to store and perform program commands, such as read only memory (ROM), random access memory (RAM), flash memory, and the like. Examples of the program commands include both machine code, such as produced by a compiler, and a high-level programming language that may be executed by the computer using an interpreter.

Also, the electronic device or the control method of the electronic device, according to the embodiments, may be included and provided in a computer program product. The computer program product may be traded between a seller and a purchaser as a commodity.

The computer program product may include a S/W program and computer-readable storage media in which the S/W program is stored. For example, the computer program product may include a product in the form of a S/W program (e.g., a downloadable app) that is electronically distributed through a manufacturer of an electronic device or an electronic marketplace (e.g., Google Play Store or AppStore). For electronic distribution, at least a part of the S/W program may be stored on storage media or may be generated temporarily. In this case, the storage media may be storage media of a server of a manufacturer, a server of an electronic marketplace, or a relay server for temporarily storing the SW program.

The computer program product may include, in a system configured with a server and a client device, storage media of the server or storage media of the client device. Alternatively, when there is a third device (e.g., a smart phone) communicatively connected to the server or the client device, the computer program product may include storage media of the third device. Alternatively, the computer program product may include a S/W program itself transmitted from the server to the client device or to the third device, or from the third device to the client device.

In this case, one of the server, the client device, and the third device may execute the computer program product to perform the method according to the embodiments. Alternatively, two or more of the server, the client device, and the third device may execute the computer program product to distribute and perform the method according to the embodiments.

For example, a server (e.g., a cloud server or an artificial intelligence server, etc.) may execute a computer program product stored on the server to control a client device communicatively connected to the server to perform the method according to the embodiments.

While the disclosure has been shown and described with reference to the embodiments thereof, it will be understood by those of ordinary skill in the art that various changes in form and details may be made therein without departing from the spirit and scope of the disclosure as defined by the appended claims and their equivalents.

The invention claimed is:

1. An electronic device comprising:
   a photographing device;
   a memory storing one or more instructions; and
   at least one processor configured to execute the one or more instructions stored in the memory to:
      capture a first image by using the photographing device,
      in response to the first image not satisfying a first condition, perform a first adjustment on an exposure value based on the first image, wherein the first condition is based on a first illumination index determined based on a histogram of pixel values of the first image,
      after performing the first adjustment, acquire a second image by applying a mask to the first image, the mask having a high weight for a region of interest of the first image,
      in response to the second image not satisfying a second condition different from the first condition, perform a second adjustment on the exposure value based on the second image, wherein the second condition is based on a second illumination index determined based on a histogram of pixel values of the second image,
      adjust at least one photographing setting value based on the adjusted exposure value, and
      capture, by using the photographing device, a third image based on the adjusted at least one photographing setting value.

2. The electronic device of claim 1, wherein the at least one processor is further configured to execute the one or more instructions to perform user authentication based on the third image.

3. The electronic device of claim 1, wherein the at least one processor is further configured to execute the one or more instructions to generate the mask based on a registration image stored in advance from a plurality of captured images.

4. The electronic device of claim 3, wherein the at least one processor is further configured to execute the one or more instructions to generate the mask by:
   determining a dissimilarity between each of the plurality of captured images and the registration image,
   comparing the dissimilarity of the registration image with a pre-set dissimilarity threshold value to determine a region of interest on a mask image based on a result of the comparing, and
   applying a higher weight to the region of interest than a weight applied to a remaining region except for the region of interest in the mask image to generate the mask.

5. The electronic device of claim 1,
   wherein the at least one processor is further configured to execute the one or more instructions to, based on the first illumination index determined based on pixel values of the first image, determine whether the first image satisfies the first condition,
   wherein, in response to the first image satisfying the first condition, a current exposure value is maintained in the first adjustment, and
   wherein, in response to the first image not satisfying the first condition, the first adjustment is performed on the exposure value.

6. The electronic device of claim 5, wherein the at least one processor is further configured to execute the one or more instructions to:
   in response to the first image not satisfying the first condition, determine whether an estimated exposure value for the first image is within a second range, and
   in response to the estimated exposure value not being within the second range, perform the first adjustment on the exposure value.

7. The electronic device of claim 1, wherein the at least one processor is further configured to execute the one or more instructions to:
   determine whether the second image satisfies the second condition based on the second illumination index determined based on pixel values of the second image,
   in response to the second image satisfying the second condition, maintain the exposure value in the second adjustment, and
   in response to the second image not satisfying the second condition, perform the second adjustment on the exposure value.

8. The electronic device of claim 1, wherein the at least one photographing setting value is selected from a group consisting of an aperture value, a shutter speed, sensitivity of an image pickup device, an exposure time, a gain, a pulse width, a current intensity, and a pulse delay.

9. The electronic device of claim 1,
   wherein the photographing device comprises an infrared photographing function, and
   wherein the at least one processor is further configured to execute the one or more instructions to instruct the photographing device to capture the first image and the third image using the infrared photographing function.

10. The electronic device of claim 1, wherein the region of interest comprises at least one region selected from a group consisting of an iris region, a face region, a palm region, a vein region, and a vehicle headlamp region.

11. A control method of an electronic device, the control method comprising:

capturing a first image;

in response to the first image not satisfying a first condition, performing a first adjustment on an exposure value based on the first image, wherein the first condition is based on a first illumination index determined based on a histogram of pixel values of the first image;

after performing the first adjustment, acquiring a second image by applying a mask to the first image, the mask having a high weight for a region of interest of the first image;

in response to the second image not satisfying a second condition different from the first condition, performing a second adjustment on the exposure value based on the second image, wherein the second condition is based on a second illumination index determined based on a histogram of pixel values of the second image;

adjusting at least one photographing setting value based on the adjusted exposure value; and capturing a third image based on the adjusted at least one photographing setting value.

12. The control method of claim 11, further comprising performing user authentication based on the third image.

13. The control method of claim 11, further comprising generating the mask based on a registration image stored in advance from a plurality of captured images.

14. The control method of claim 13, wherein the generating of the mask comprises:

determining a dissimilarity between each of the plurality of captured images and the registration image;

comparing the dissimilarity of the registration image with a pre-set dissimilarity threshold value to determine a region of interest on a mask image based on a result of the comparing; and applying a higher weight to the region of interest than a weight applied to a remaining region except for the region of interest in the mask image to generate the mask.

15. The control method of claim 11, further comprising:

based on the first illumination index determined based on pixel values of the first image, determining whether the first image satisfies the first condition, wherein, in response to the first image satisfying the first condition, the performing of the first adjustment comprises maintaining a current exposure value, and wherein, in response to the first image not satisfying the first condition, performing the first adjustment on the exposure value.

16. The control method of claim 15, wherein the performing of the first adjustment comprises:

in response to the first image not satisfying the first condition, determining whether an estimated exposure value for the first image is within a second range, and in response to the estimated exposure value not being within the second range, performing the first adjustment on the exposure value.

17. The control method of claim 11, further comprising:

determining whether the second image satisfies the second condition based on the second illumination index determined based on pixel values of the second image;

in response to the second image satisfying the second condition, maintaining the exposure value in the second adjustment; and in response to the second image not satisfying the second condition, performing the second adjustment on the exposure value.

18. The control method of claim 11, wherein the at least one photographing setting value is selected from a group consisting of an aperture value, a shutter speed, sensitivity of an image pickup device, an exposure time, a gain, a pulse width, a current intensity, and a pulse delay.

19. The control method of claim 11, wherein the region of interest comprises at least one region selected from a group consisting of an iris region, a face region, a palm region, a vein region, and a vehicle headlamp region.

20. A computer program product comprising a non-transitory recording medium storing program commands instructing, when being executed by a processor, the processor to perform a control method of an electronic device, the control method of the electronic device comprising:

capturing a first image;

in response to the first image not satisfying a first condition, performing a first adjustment on an exposure value based on the first image, wherein the first condition is based on a first illumination index determined based on a histogram of pixel values of the first image;

after performing the first adjustment, acquiring a second image by applying a mask to the first image, the mask having a high weight for a region of interest of the first image;

in response to the second image not satisfying a second condition different from the first condition, performing a second adjustment on the exposure value based on the second image, wherein the second condition is based on a second illumination index determined based on a histogram of pixel values of the second image;

adjusting at least one photographing setting value based on the adjusted exposure value; and capturing a third image based on the adjusted at least one photographing setting value.

* * * * *